(12) United States Patent
Langhammer

(10) Patent No.: US 7,797,195 B2
(45) Date of Patent: Sep. 14, 2010

(54) MERCHANT-AFFILIATED DIRECT WHOLESALE MARKETING AND FULFILLMENT SYSTEM

(76) Inventor: Michael Jay Langhammer, 198 Martha La., Fairfield, OH (US) 45014

( * ) Notice: Subject to any disclaimer, the term of this patent is extended or adjusted under 35 U.S.C. 154(b) by 0 days.

(21) Appl. No.: 10/097,842

(22) Filed: Mar. 14, 2002

(65) Prior Publication Data
US 2002/0099622 A1 Jul. 25, 2002

(51) Int. Cl.
G06Q 30/00 (2006.01)
(52) U.S. Cl. .......................................... 705/26; 705/27
(58) Field of Classification Search .............. 705/26–27
See application file for complete search history.

(56) References Cited

U.S. PATENT DOCUMENTS

| | | | | |
|---|---|---|---|---|
| 5,570,292 | A | 10/1996 | Abraham et al. | 364/473.01 |
| 5,710,887 | A | 1/1998 | Chelliah et al. | 395/226 |
| 5,748,484 | A | 5/1998 | Cannon et al. | 364/479.03 |
| 5,822,736 | A * | 10/1998 | Hartman et al. | 705/1 |
| 5,898,594 | A | 4/1999 | Leason et al. | 364/479.01 |
| 5,898,777 | A | 4/1999 | Tycksen, Jr. et al. | 380/4 |
| 5,913,210 | A | 6/1999 | Call | 707/4 |
| 5,930,769 | A | 7/1999 | Rose | 705/27 |
| 5,940,807 | A | 8/1999 | Purcell | 705/26 |
| 5,963,915 | A * | 10/1999 | Kirsch | 705/26 |
| 5,970,472 | A * | 10/1999 | Allsop et al. | 705/26 |
| 6,029,141 | A | 2/2000 | Bezos et al. | 705/27 |
| 6,125,352 | A * | 9/2000 | Franklin et al. | 705/26 |
| 6,282,517 | B1 * | 8/2001 | Wolfe et al. | 705/26 |
| 6,351,738 | B1 * | 2/2002 | Clark | 705/27 |
| 6,473,740 | B2 * | 10/2002 | Cockrill et al. | 705/27 |
| 6,490,601 | B1 * | 12/2002 | Markus et al. | 707/507 |

OTHER PUBLICATIONS

Barmann, "Shopping by Computer Internet Connects You to Auto Information," Jan. 28, 1996, Proquest.*
Authorization Levels: Merrill; "Xerox readies tech program," Computer Reseller News, Jan. 23, 1995, i614p. 92, Proquest #8789273, 3pgs.*
Authorization Levels: Semilof; "New world, new sales channel," Computer Reseller News, May 25, 1998, i790p. 109, Proquest #29724908, 3pgs.*
Authorization Levels: Donovan; "Novell announces new reseller stratification plan," Business Wire, Sep. 25, 1990, Proquest #6402898, 3pgs.*

(Continued)

*Primary Examiner*—Robert M. Pond
(74) *Attorney, Agent, or Firm*—Wood, Herron & Evans, LLP

(57) ABSTRACT

A merchant-affiliated direct wholesale marketing and fulfillment system. A computer server receives information from a consumer and from this information assigns the consumer to one of a plurality of independent retail merchants. The server then provides the consumer's remote computer with identifying information for the assigned retail merchant, to be displayed along with information regarding products for sale. Consumers may then purchase products directly from the organization operating the server, with a partial profit from the transaction delivered to the assigned retail merchant. Consumers may also purchase products at merchants' retail locations, in which case a transaction is consummated between the organization operating the server and the merchant, permitting the merchant to resell the purchased item to the consumer. The system may also be used for fulfillment by merchants.

26 Claims, 12 Drawing Sheets

OTHER PUBLICATIONS

JewelrySearch: Internet Archive Wayback Machine, www.archive.org; www.jewelry-search.com; Jan. 25, 1998, 11pgs.*

Advertisement, *Jewelry Search News Update Winter 1999*, National Jeweler Publication, vol. 43, No. 6, Mar. 16, 1999, pp. 26-27.

* cited by examiner

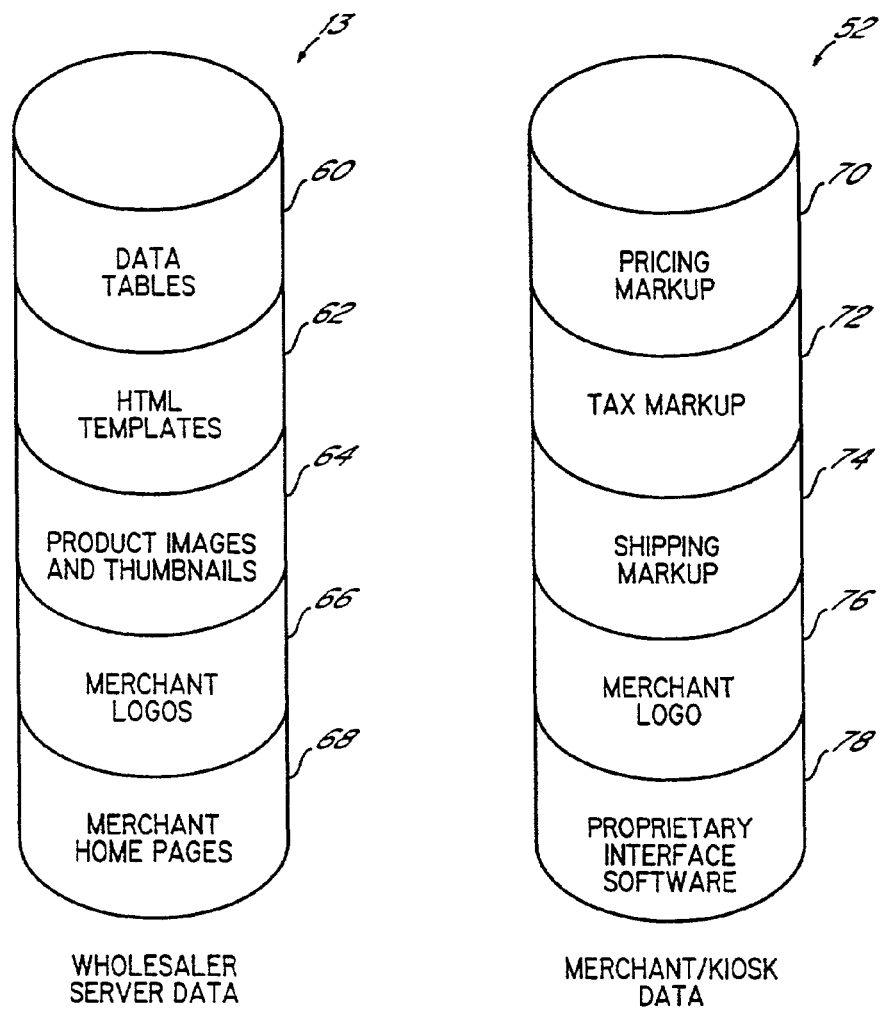

MERCHANT-AFFILIATED DIRECT WHOLESALE MARKETING AND FULFILLMENT SYSTEM

FIELD OF THE INVENTION

The present invention relates to management information systems that facilitate retail sales of goods to consumers.

BACKGROUND OF THE INVENTION

Traditional retail merchandising involves establishing a storefront in an appropriate commercial district, hiring and training a knowledgeable sales staff to handle consumer inquiries regarding products for sale, and maintaining regular business hours during which consumers may visit the storefront, review items for sale, and discuss those items with a salesperson. The merchant typically makes sales to consumers out of the inventory available at the store, and replenishes inventory as it becomes depleted through sales.

In some environments, a merchant will take catalog orders from consumers, in which case the merchant orders the desired item from a wholesaler or manufacturer. This is often done to free sales staff to handle all of the available customers. When a catalog order is made, the item is delivered to the merchant, and the consumer returns to the storefront to take delivery. Independent merchants often discourage catalog shopping because purchases through catalogs by definition will create a backorder for the merchant, requiring the administrative overhead of tracking the backorder and contacting the customer upon delivery to complete the sale, which is burdensome as compared to directly selling from existing inventory. Furthermore, particularly in those markets where customers are time-sensitive (such as fine jewelry, where many customers are shopping for gifts that must be obtained by a specified date), the uncertain nature of the delivery date of catalog orders makes the use of catalogs undesirable.

This traditional process for selling at retail involves substantial overhead costs in a number of areas. Maintaining a commercial storefront in an attractive commercial district involves monthly rent expense. Hiring and training sales staff to wait on consumers involves labor expense. The fixed cost of inventory also represents an interest expense. These overhead costs are directly reflected in the retail prices that are charged to consumers for products sold in the store.

The recent availability of Internet access to a large number of consumers, has spurred the use of the Internet as a commercial medium for directly selling products to consumers. This use of the Internet is popularly known as electronic commerce or e-commerce.

E-commerce merchants have several significant cost advantages as compared to traditional retailers, and as a result e-commerce retail merchants often can undercut the prices of traditional retail merchants. E-commerce merchants do not need to maintain a storefront in an attractive commercial district; rather, all that is required is a computer system connected to the Internet, which can be at any physical location that is desired, including a private home. In addition, e-commerce merchants have the advantage that, in many circumstances, sales taxes applicable to traditional merchants need not be collected by an e-commerce merchant due to the interstate nature of a transaction and/or tax moratoriums that have been initiated to stimulate the development of e-commerce. This also makes the retail price of an e-commerce merchant appear lower to consumers.

Traditional merchants have attempted to confront the threats posed by e-commerce by also connecting to the Internet. For example, several larger merchant chains have established Internet sites at which consumers can browse and compare available merchandise, much as is done at a retail store. To date, however, only the largest retail merchants, typically chains of large stores, have undertaken the task of creating such a system. There are several reasons for this. First, substantial programming expense is currently required to create a comprehensive Internet server application for marketing products. Smaller merchants cannot amortize this cost over a large quantity of products sold. Furthermore, smaller merchants of necessity have a smaller inventory than the combined inventory of the stores in a large retail chain, and so have difficulty matching on a product-for-product basis, the offerings of larger e-commerce merchants. Finally, the business model used by many traditional independent merchants assumes that shoppers will make purchases from existing inventory, for the reason that existing inventory is all that is available for review at the retail site. In an e-commerce environment, however, consumers viewing lists of items for sale identified on-line, will be able to submit purchase requests for items that may not be in inventory at the time of the purchase. This requires the merchant to have the organizational arrangements in place to handle and track a substantial number of backorders, which large chain stores often already have in place, but independent merchants lack.

The efforts by traditional merchants to combat e-commerce, to a large extent assume that consumers use the Internet for information gathering, and will make purchases from retail outlets at essentially retail prices. A traditional retail merchant cannot charge different pricing for sales using the Internet, than for sales from its retail store, without undermining the investments the merchant has made in its own retail presence. Indeed, some merchants that have an Internet presence, still require a consumer to visit a retail site to make purchases, apparently to ensure that retail traffic will pass through the retail store, ensuring awareness of consumers to the location of the retail store and the products it carries.

A problem with this model of consumer behavior is that it assumes that consumers will be compelled to purchase goods from those parties that provided information on the goods. Although this was true in the traditional retail environment, where consumers cannot readily move from one merchant to another merely for the purpose of price shopping, in e-commerce, this is not the case. Users do not always expect e-commerce merchants to have an available knowledgeable sales staff ready to answer consumer questions. Indeed, consumers often expect no more than to be able to connect to the e-commerce merchant's server and place orders for shipment to the consumer. A savvy e-commerce consumer collects information on products from whatever sources are available, and then makes the purchase from the merchant with the lowest price. There are now Internet services having the sole function of finding the lowest price for a given product, which facilitates this approach.

In those markets where products are well known to consumers and relatively readily compared, consumers will not need to have substantial information to make retail purchases. However, in some retail markets, consumers require substantial product information before reaching a purchase decision. Two examples of this kind of retail market are the consumer electronics and fine jewelry markets. In both markets, consumers are relatively unfamiliar with particular products and their relative value and merits, and must collect information to reach a particular purchase decision.

In those retail markets that are dominated by branded merchandise, for example, the consumer electronics market, and the market for watches, consumers can readily obtain product information. Manufacturers desiring to enhance sales provide detailed information on their products in printed materials and on Internet-accessible servers, allowing consumers to collect information on products independently of particular merchants. When collecting information on branded merchandise, e-commerce consumers can also take advantage of traditional retail merchants, by visiting merchants to view products and collect product information from knowledgeable sales staff, so that an informed purchase of the desired brand and model can later be made from the e-commerce merchant with the lowest pricing.

Manufacturers of brand-name merchandise selling to retail markets dominated by brand names, are aware of the likelihood for price-shopping by consumers, particularly using e-commerce. Manufacturers often wish to discourage such price shopping, for several reasons. Manufacturers of premium brand products wish to maintain high retail price levels to preserve the premium nature of the brand. Furthermore, manufacturers of brand products want to ensure that traditional merchants will carry their merchandise and exert efforts to sell it (whether through their own stores or, unwittingly, through competitors); the best way to do this is to ensure that merchants will make attractive profit margins on sales of those products. To meet these goals, manufacturers have in the past instituted retail price maintenance policies, such as refusing to sell to merchants that sell below a manufacturer-mandated minimum price, or limiting distribution to limited numbers of merchants in particular territories. To combat price erosion due to e-commerce, some manufacturers have instituted a policy of refusing to sell to merchant that make retail sales via the Internet. Although manufacturer policies of this sort are detrimental to e-commerce, manufacturers are not philosophically opposed to e-commerce. Manufacturers would welcome the additional sales volume that might arise through e-commerce, if the manufacturer could monitor retail pricing to enforce existing policies, and thus be sure not to undermine traditional retail merchants. Traditional merchants, particularly those lacking the resources to begin e-commerce, are opposed to brands that permit other merchants to sell via the Internet, and the risk of alienating these merchants has caused many manufacturers to continue to maintain policies prohibiting Internet sales.

There are some markets that are not dominated by brand merchandise. One example is the market for fine jewelry (with the exception of watches), in which manufacturer brand names, while known to merchants, are relatively unknown to customers. In these markets, e-commerce faces substantial challenges. Although consumers have shown a willingness to buy brand-name merchandise via the Internet, even from completely unknown merchants, this willingness is based on familiarity with the manufacturer and its brand names, and assumed control that the manufacturer has over its product distribution. Unbranded merchandise, however, does not benefit from brand-name familiarity, making consumers substantially more wary, and largely unwilling to purchase unbranded merchandise from unknown merchants. Unbranded merchandise, therefore, can only be effectively sold via the Internet by national, well known merchants, as such organizations can use their reputation as a substitute for brand recognition.

The merchants that bear the greatest business risk of losing business due to e-commerce, are the traditional independent single location retail merchants. The risk is particularly high to those merchants that deal in retail markets that lack strong brand names, such as traditional single location fine jewelry stores; these stores are unlikely to be protected by manufacturers via price minimums and Internet sales prohibitions, and these stores lack the resources and inventory necessary to commence e-commerce and compete on an item-to-item basis with national chains. Furthermore, even those independent merchants dealing in brand name dominated industries, will eventually lose the protections imposed by manufacturers and begin to lose sales to e-commerce competitors.

It is therefore an object of the present invention to facilitate the rapid entry of small, independent merchants into e-commerce, providing those merchants with an inventory and a nationwide reputation that can be competitive with much larger merchants. It is a further object to protect such merchants from erosion of their retail pricing resulting from competition between their respective e-commerce businesses.

It is another object of the present invention to facilitate e-commerce sale of goods by merchants, in a manner that induces manufacturers to allow their goods to be sold via e-commerce, by protecting manufacturers and retail merchants from the effects of price erosion.

It is a further object of the present invention to facilitate catalog sales by merchants at retail locations, by improving the delivery of catalog information to consumers visiting retail locations, while minimizing the administrative burden to merchants associated with tracking backorders, with no greater expense to merchants than is incurred through the use of traditional printed catalogs.

It is another object of the present invention to manage a catalog of items for sale via e-commerce in a manner that minimizes administrative burden on merchants using the system.

SUMMARY OF THE INVENTION

These and other objects of the invention are met in accordance with the principles of the present invention, which provide a merchant-affiliated direct wholesale marketing and fulfillment system.

In accordance with a first aspect of the invention, this system comprises a computer server for connecting to a remote computer system under control of a consumer, the server delivering to the remote computer system, information regarding products for retail sale. The computer server receives information from the consumer and from this information assigns the consumer to one of a plurality of independent retail merchants that are affiliated with the server. The server then provides the remote computer with identifying information for the assigned retail merchant, to be displayed by the remote computer along with information regarding products for sale.

In the particular embodiment described below, each retail merchant's markup is set by the merchant, by reference to a wholesale price for particular items. After a merchant has been assigned to a consumer, the server retrieves the merchant's markup information, and computes from it a retail price to display to the consumer along with the identifying information for the retail merchant, which may be a name, logo or any other graphic information unique to a merchant.

In this disclosed embodiment, the server permits a consumer to consummate a retail transaction to purchase a product. The server collects payment and address information from the consumer and arranges for shipment of the purchased item to the consumer. The resulting transaction is between consumer and the business entity operating the server, and does not involve the retail merchant. However, a profit check representing partial profit margin for the sale, is delivered to the merchant assigned to the consumer at the time of the transaction, as a reward for the affiliation of that merchant with the transaction.

In the described embodiment, pricing information for products for sale are not delivered to the remote computer or displayed to the consumer, until after the consumer has been assigned to an affiliated retail merchant. Once a consumer is assigned to an affiliated retail merchant, the identifying information supplied by the server for the assigned retail merchant, is stored in the remote computer system to prevent reassignment of consumer to another retail merchant, and to prevent the consumer from viewing pricing of another retail merchant.

In the specific embodiment described herein, this identifying information is stored temporarily by the remote computer, although it could be stored permanently. In the described embodiment, before a consumer can consummate a transaction to purchase a product, the server requires the consumer to request and be assigned a permanent login identification. The server associates this permanent user login identification with a particular retail merchant. Subsequently, when a consumer supplies a login to the server, the server again delivers identifying information for the merchant that has been previously associated with the supplied login.

In the described embodiment, the identifying information provided by a consumer is a zip code, and a retail merchant is selected and assigned to the consumer by locating an affiliate merchant having the nearest to a matching zip code. Where multiple merchants have equally similar zip codes, a merchant is selected at random.

In this embodiment, the identification of an affiliated merchant that is supplied to the remote computer, includes both a logo or other graphical information and an identifier useable by the server for identifying the merchant. The identifier is returned to the server during interaction of the remote computer and server to ensure that only pricing information for the assigned retail merchant is provided to the remote computer.

A system operating in accordance with this aspect of the invention provides affiliated retail merchants with a virtual Internet site through which those retail merchants can provide products to consumers in competition with other e-commerce providers. Because the merchants utilize a common server for storing and delivering product information, the merchants are freed from the cost and burden of managing independent Internet systems.

In accordance with a related aspect of the present invention, the server maintains an identification of those products that are authorized for on-line sale by each merchant. Once a merchant has been assigned to a consumer, the server does not provide product information for any products that the merchant is not authorized to sell on-line. In this way, the server can enforce restrictions imposed by manufacturers as to particular merchants that are permitted or not permitted to perform on-line sales.

In the disclosed particular embodiment, products are associated with a manufacturer and a manufacturer's authorization level, and each retail merchant is associated with one or more authorization level for each manufacturer. The server determines whether there is a match between the authorization level of a retail merchant for a particular manufacturer and the required authorization level for a particular product, before providing product information to a consumer that has been assigned to that retail merchant.

Furthermore, in accordance with another related aspect of the present invention, the server maintains a listing of current available inventory of the business entity. Using this information, the server does not provide product information for any products that are not currently available. In this way, the server can avoid backorders, and provide accurate delivery times for items ordered on-line.

In the disclosed particular embodiment, available inventory for a product is reduced as soon as a purchase of the product has been consummated by the server. When a purchase of a product is requested by a consumer, availability of the product is confirmed before continuing to consummate the sale to ensure that the product has not become unavailable while the consumer was connected to the server.

In this disclosed embodiment, the business entity operating the direct marketing system also operates as a wholesaler, and sells products to retail merchants. Retail merchants may connect to the server via a remote computer to place orders for products. When an order by a merchant is completed, available inventory for the product is immediately reduced by the server.

In a related aspect of the present invention, consumers present at the place of business of a retail merchant may also connect to the server via a remote computer to place orders for products. In this context, the consumer is always assigned to the retail merchant where the consumer is present. Purchases made by the consumer are authorized by the retail merchant, and then delivered to the retail merchant. The sale transaction for the product is consummated between the retail merchant and the consumer, and the consumers purchase is treated as a merchant order by the business entity operating the direct marketing system. The shipping cost for the item is identified to the remote computer so that the merchant may charge the consumer for shipping.

In the disclosed specific embodiment, all orders received for shipment to a particular address on a given day, such as a retail merchant or a particular consumer, are shipped in a single package.

In the disclosed specific embodiment, the business entity operating the direct marketing system may provide the remote computer to affiliated retail merchants for free or a reduced price to enable use of the system by affiliated merchants.

In a final aspect, the direct marketing system may be utilized to perform fulfillment of orders placed by consumers of a retail merchant. In accordance with this aspect, information regarding orders that have been taken by a retail merchant is transferred to the system of the present invention. This information is entered into the system to permit fulfillment of the orders by direct shipment to customers.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

FIG. 2A is an illustration of the data stored in the mass storage device connected to the central server illustrated in FIG. 1.

FIG. 2B is an illustration of the data stored in the mass storage device connected to the retail workstation illustrated in FIG. 1.

DETAILED DESCRIPTION OF SPECIFIC EMBODIMENTS

Figure 1:
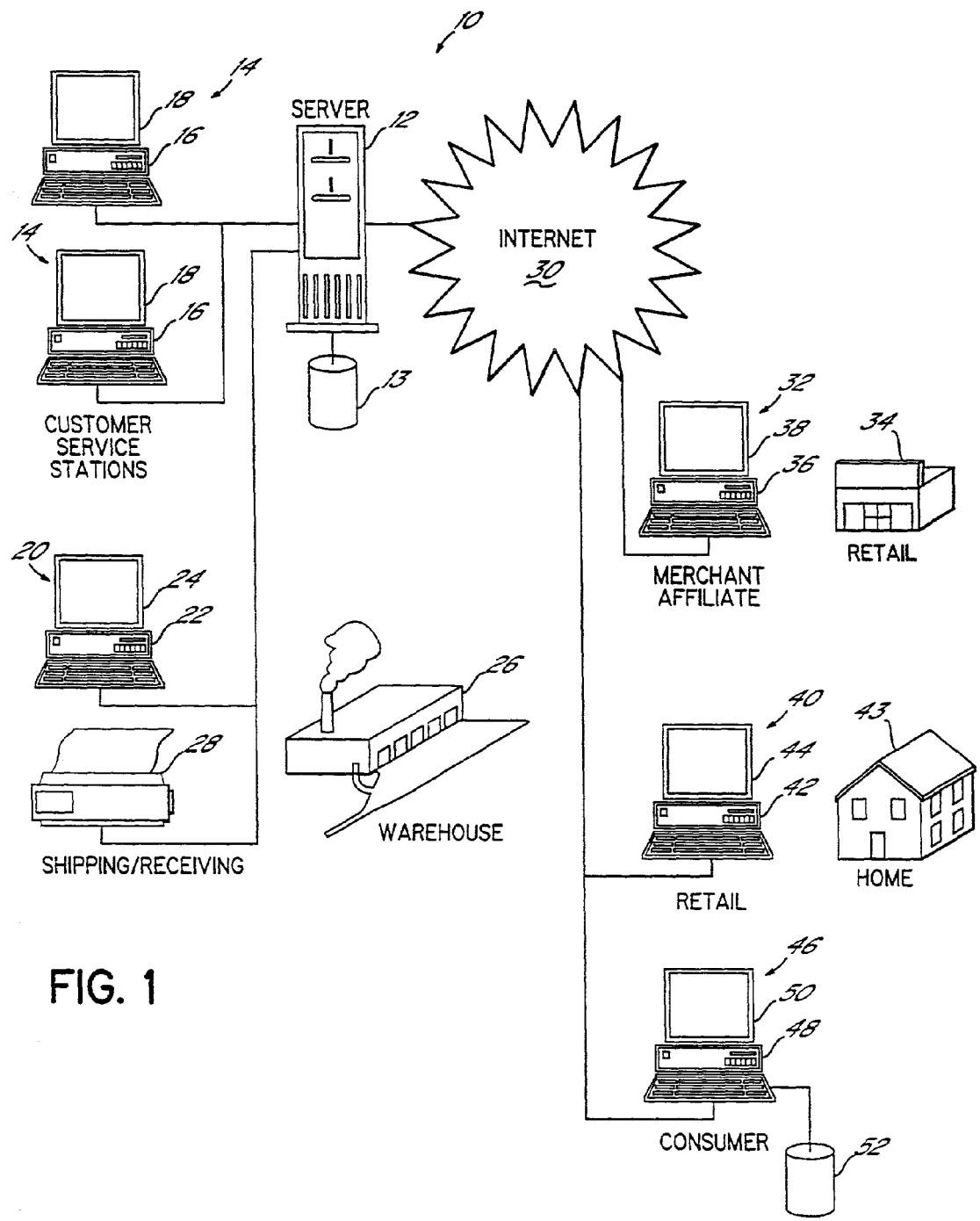
FIG. 1 is an illustration of an interconnected computer network for carrying out principles of the present invention, including a computer server and mass storage device for communicating with consumers and merchants to receive orders and provide information on orders, and for use by customer service and shipping personal to fulfill and support received orders.

Referring to FIG. 1, the major components of a merchant affiliated direct marketing system 10 can be seen. At the heart of system 10 is a computer server 12 programmed to carry out methods of the present invention and generally oversee the operation of the entire system 10. Computer server 12 is a high capacity network server such as are commercially available from a variety of vendors. Server 12 accesses a storage device 13 which may be a solid state memory, dynamic access storage device (DASD, i.e., hard disk or hard disk array), or other storage device. Sever 12 and storage device 13 must have sufficient processing and storage capacity to handle the volume of business that is conducted by the entity owning server 12 following the methods of the present invention. It will be appreciated that for different applications involving different business volumes, server 12 may be configured as a single processor server or may be configured as a network of servers each operating in concert and carrying out parallel processes in the manner described in the following figures. Further, storage device 13 may be configured as a single storage device or as a network of storage devices. Each of these embodiments is within the scope of the present invention.

Computer server 12 is connected via local or wide area connections to a plurality of customer service workstations 14 each of which includes a client computer 16 and display 18 for use by customer service personnel interacting with computer server 12. Server 12 is further connected via a local or wide area connection to one or more shipping and receiving client computers 20, each of which similarly includes a client computer 22 and display 24. Customer service workstations 14 are located at a customer service facility, typically an office of the business entity that is operating server 12 and is the proprietor for the merchant affiliated direct marketing business described in the present application. Customer service workstations 14 may be in a different physical location then shipping and receiving workstation 20. Furthermore, there may be multiple customer service locations where workstations 14 are located, and multiple shipping and receiving client computers 20 in multiple locations. Shipping and receiving client computers 20 are typically located in a warehouse 26 at which the goods that are sold using the merchant affiliated marketing system of the present invention are stored for shipment to merchants and consumers.

To facilitate management of the shipment of products to merchants and consumers from warehouse 26, a printer 28 is located within warehouse 26 for printing shipping invoices generated in accordance with the methods of the present invention so that personnel at warehouse 26 may use this printed information to pick items for shipment from warehouse 26 and build packages to be delivered to consumers or merchants.

Server 12 is also provided with an Internet connection through an Internet service provider, allowing server 12 to connect to the public Internet computer network 30. Through this connection server 12 may communicate with merchant affiliate workstations 32, consumer workstations 40 and retail workstations 46 as discussed below. The nature of the communication between workstations 32, 40 and 46 may utilize a variety of Internet protocols. As described herein, communications between server 12 and merchant affiliated workstations 32 or consumer workstations 40 is performed by using a hypertext transfer protocol (HTTP), with information transferred as hypertext markup language (HTML) files for display by workstations 32 and 40 using web browser software. As described herein, communications with retail workstations 46 may utilize HTTP or other Internet protocols such as Telnet or FTP connections, with the retail workstations 46 using proprietary software to support these connections with server 12 and obtain the appropriate data from server 12 for delivery to the user of the retail workstation 46.

Merchant workstations 32, one of which is shown in FIG. 1, are possessed by merchant affiliates of the business entity operating server 12. The merchant affiliate workstations would typically be located at the retail site 34 used by a merchant, but may be located at a separate physical facility, such as a merchant's separate office or at a merchant proprietor's private home. Merchant affiliate workstations 32 comprise a computer 36 and display 38 for use by the merchant for interacting with server 12 using web browser software to display HTML pages produced by server 12. It will be appreciated that in a typical embodiment of the present invention there will be plurality of merchant affiliates associated with the business entity operating server 12, and thus a plurality of merchant workstations 32 connected in various ways through Internet 30 to server 12. Further details on the user of merchant workstations 32 to interact with server 12 for the purpose of ordering and account management will be discussed below with reference to FIG. 6.

Consumer workstations 40 are typically located at consumers' private homes such as home 43. Consumer workstations however may not always be at private homes, but may also be at consumer workplaces, or may indeed be in any location that can be reached through the Internet including public facilities providing Internet connections such as public libraries and Internet cafes'. A consumer workstation 40 comprises a computer 42 and display 44 for coupling to server 12 through the Internet, and receiving and displaying HTML pages produced by server 12 in accordance with the principles of the present invention. Details on the interaction of a consumer with server 12 to carry on methods of the present invention are provided by FIGS. 4A through 4D as described below. It will be appreciated that in a typical embodiment of the present invention there are a plurality of consumer workstations 40 at a plurality of locations each accessible to server 12 through Internet 30, and that these workstations are used at various times, and often simultaneously, to access server 12 to perform purchases and other activities that are described below.

Retail workstations 46 are also connected through Internet 30 to server 12. Retail workstations, one of which is illustrated in FIG. 1, are typically located in a retail location such as the storefront of a affiliate merchant or a retail kiosk managed by an affiliated merchant. Retail workstations 46 include a computer 48 and a display 50 for obtaining and displaying information from server 12 to consumers operating the retail workstation. Unlike the merchant workstations and consumer workstations 40, in the presently described embodiment of the invention, retail workstations 46 utilize proprietary software to display information to consumers, and derive a substantial quantity of the information that is displayed to consumers from locally available data stored in a mass storage device 52 such as a hard disk drive attached to computer system 48. Thus while merchant affiliate workstations 32 and consumer workstations 40 obtain most of the information needed for carrying out principles of the present invention through Internet 30 from server 12, retail workstations 46 derive much of the needed information for carrying out principles of the present invention hard disk drive 52. Operations performed in a retail workstation 52 are described in detail below with reference to FIG. 5.

It will appreciated that workstations 32 and 40 may also be outfitted with mass storage devices as is typically the case in commercially available personal computers, but that such is not necessarily required in the embodiment of the invention being described herein, particularly where such workstations are special purpose "web" computers having minimal storage capacity, and thus mass storage devices have not been shown in FIG. 1 associated with those workstations 32 and 40 and only associated with workstation 46.

It will be further appreciated that in other embodiments of the invention, workstations 32, 40 and 46 could all derive information from local storage as well as from server 12 via Internet 30 to carry out principles of the present invention, and many web browsers currently available often cache information on HTML pages accessible through the Internet on a mass storage device and thus a mass storage device may be utilized by merchant workstations 32 and consumer workstations 40 to store information to carry out principles of the present invention even though one is not required. It will further appreciated that retail workstation 46 could utilize publicly available software for displaying HTML files accessed from server 12 through Internet 30 rather than using proprietary software, and workstations 32 and 40 could use proprietary software to access server 12 through Internet 30 rather than using standard web browser software. Furthermore, workstations 46 could derive all information displayed by workstations 46 from server 12 rather than obtaining some information from a local mass storage device 52.

Referring now to FIG. 2A, details of the information stored in mass storage device 13 can be explained. This mass storage device 13 contains first and foremost a database 60 of information for carrying out principles of the present invention. This information is stored as a plurality of data tables have various formats including those shown and discussed below with reference to FIG. 3. Server 12 interoperates with data in data tables 60 to carry out principles of the present invention in accordance with FIGS. 4A through 8. Mass storage device 13 further includes templates and formats 62 for catalog pages, which are utilized along with information in data tables 60 to generate HTML files for delivery to consumer workstations 40 and merchant affiliate workstations 32 to carry out principles of the present invention. It will appreciated that server 12 produces dynamic HTML pages with a variety of information some of which is derived from live data found in data table 60, and that in most instances HTML pages accessed by consumers or merchants from server 12 are not permanently stored in any located in server 12, but are dynamically assembled by server 12 using templates 62 and data from data table 60.

Mass storage device 13 further stores graphic files 64 of products sold using the methods of the present invention. These graphic files typically comprise images of products and thumbnail or small images of those products to be included in the HTML pages produced by server 12 to consumers at consumer workstations 40 or retail workstations 46. These product images and thumbnails may be stored in a variety of formats that are typically used by web browsers such as the standard and well known GIF or JPEG formats.

Mass storage device 13 further stores merchant logos 66 used to identify an affiliated merchant when server 12 is producing HTML pages that identify an affiliated merchant in accordance with the principles of the present invention, as described below. Mass storage device 13 also includes, for some or all of the merchant affiliates, merchant home pages 68 defined by those merchant affiliates. The business entity operating the merchant affiliated direct marketing system may provide a service of hosting merchant home pages as a adjunct to the merchant affiliate direct marketing system. Those merchants using this service will be hosted by server 12 and stored in area 68 of mass storage device 13.

Referring now to FIG. 2B, the information maintained in a retail workstation's mass storage device 52 can be discussed. This information comprises a variety of merchant specific information, most importantly including a pricing markup table 70, a tax markup table 72 and a shipping markup table 74. Each of these tables identifies markups supplied by the merchant, to be applied to the wholesale price of merchandise purchased from the business entity operating the direct marketing system. The information on table 70 identifies the pricing markup utilized by the merchant. The pricing markup may be a fixed percentage, or may be a different percentage for different categories of goods or goods from different manufacturers. Furthermore the markup applied to goods may be a variable percentage rate based upon the wholesale cost of those goods, with higher priced wholesale goods obtaining a larger or smaller pricing markup. Tax markup table 72 identifies markups to be applied for a local sales tax applicable to the merchant for retail sales. Tax markup table 72 includes sufficient detail to accurately compute sales taxes. Shipping markup table 74 identifies shipping markups applied by merchants to goods purchased by consumers utilizing the direct marketing system of the present invention. Here again, the shipping charges applied by merchants may be variable for different categories of goods and may be based upon shipping weight or retail price or a combination of both factors or other factors that the merchant wishes to apply.

Mass storage device 52 also includes storage for merchant logos 76. Information stored in this area typically includes graphic files for merchant logos but may include in addition to static graphic files video and audio files that can be played by to consumers to attract their attention to the retail workstation 46 or provide information to consumers at retail workstations 46 in a merchant specific manner. Also included in mass storage device 13 is proprietary interface software 78 used by the retail workstation 46 to communicate with server 12 through Internet 30 in accordance to the process described below with reference to FIG. 5.

Figure 3A:
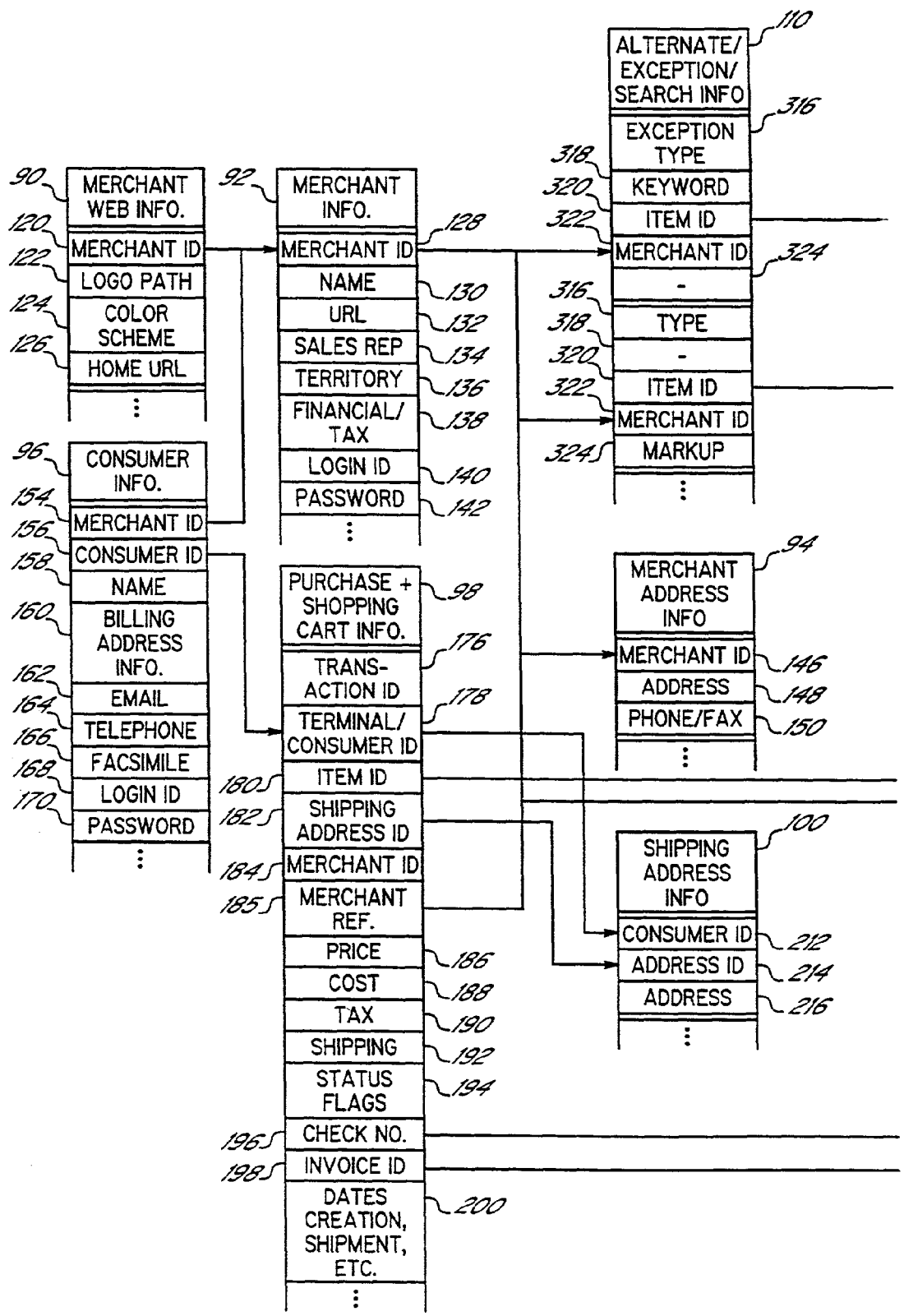
FIG. 3, comprising FIG. 3A and FIG. 3B which adjoin, is an illustration of the database schema for data tables stored in the mass storage device of the central server illustrated in FIG. 1.

Referring now to FIG. 3, details of the formats of the data tables 60 in mass storage device 13 can be understood by reference to the database schema of those tables. FIG. 3 illustrates a plurality of data tables for storing crucial information for carrying out principles of the present invention. The data tables illustrated in FIG. 3 include various tables related to affiliate merchants including a table 90 (FIG. 3A) for storing information describing the merchant's desired appearance in HTML pages produced by server 12. Also included is a table 92 (FIG. 3A) for providing financial and contact information on merchants, and a table 94 (FIG. 3A) for providing addresses for merchants.

Tables are also included for consumer related information. These tables include a table 96 (FIG. 3A) for consumer information, and a table 98 (FIG. 3A) for storing information on items that have been selected for purchase and purchased by consumers. Information needed for shipping products to consumers and merchants is supplied by a table 100 (FIG. 3A) storing shipping addresses, and a table 102 (FIG. 3B) for storing information on shipping invoices.

The data tables 60 also store item information for the products that are sold via the direct marketing system. The primary table for item information is a table 104 (FIG. 3B) storing basic information for each item carried by the business entity operating the direct marketing system. Auxiliary tables related to table 104 include a manufacturer authorization table 106 (FIG. 3B) for identifying manufacturers authorized to carry certain items and a markup table 108 (FIG. 3B) for identifying merchant price markups on particular items. An additional table 110 (FIG. 3A) is used to identify specific exceptions to the general rules defined by table 104, 106 and 108, and to provide alternate search keys useful in connection with table 104.

A final table used in accordance with the principles of the present invention is a table 112 (FIG. 3B) for storing information on distributions of profits to merchants for sales conducted in affiliation with the merchant using the system. It will be appreciated the server 12 may manage the tables forming the database structures illustrated in FIG. 3 using any of a number commercially available database software programs. In the illustrated embodiment, a database software program consistent with standard query language SQL is utilized, although in other embodiments, non-SQL: database management software may be used.

Throughout FIG. 3, each table is described with reference to the fields of each record in the table. One record is shown for each of the tables discussed in FIG. 3. It will be appreciated that typically numerous records will be included in any given table, one record for each merchant, consumer, item, or element of related information being stored in the database.

As seen in FIG. 3A, records in the merchant web information table 90 include various fields for information useful in defining the Internet presence of a merchant. Specifically, a field 120 provides an identifier unique to the merchant used in cross referencing the merchant and the web display information for a particular merchant. A field 122 includes a path to a location on server 12 or on the Internet where a merchant's logo may be found. A field 124 describes a color scheme to be used when the merchant is associated with display of the catalog stored on server 12. A field 126 identifies an Internet address or universal resource locator (URL) for the merchant's home page, which can be used to direct the user to the merchant's home page in accordance with the principles of the present invention. These fields completely define, for the purposes of server 12, the Internet presence of a merchant on server 12 and on the Internet. There is a record in the merchant web information table 90 for each merchant affiliated with the direct marketing system of the present invention.

Continuing on FIG. 3A, a merchant information table 92 provides information for each merchant affiliated with the direct marketing system, which can be used in business transactions with the merchant. This information includes a merchant identifier in a field 128 that uniquely identifies the merchant, which is the same identifier used in field 120 in table 90, as is indicated by the connecting lines between these fields in the data base schema illustrated in FIG. 3. Also included is a name field 130 for a text name of the merchant. Further fields include an URL field 132 for storing an Internet address at which the merchant can be contacted, and a sales representative field 134 for identifying a sales representative for the merchant. Field 136 identifies the territory in which the merchant operates, and a field 138 identifies financial information for the merchant including an credit status for the merchant, a tax ID for the merchant and other information needed for accounting purposes. The last two fields 140 and 142 are used specifically by the server 12 when determining whether to accept merchant orders, and authorizations from merchants for customer orders, in accordance with the processes illustrated in FIGS. 5 and 6. These fields include a login ID field 140 for storing a login identifier for a merchant and a password field 142 for identifying a password for the merchant. Authorization from a merchant for a particular transaction takes the form of a combination of a login identifier and a password which must match the information stored in merchant information table 92 for the merchant authorization to be accepted.

Continuing in FIG. 3A, merchant addresses are separately stored in a merchant address information table 94. This table includes a field 146 for a merchant identifier (which, as illustrated in the FIG. 3 schema, maps to the fields 120 and 128 in tables 90 and 92, respectively). An additional field 148 (which may include several fields) is used to store address information for the merchant and a further field 150 is used to store telephone and facsimile information for the merchant. Multiple merchant addresses may be stored for any particular merchant in a merchant address information table 94. Multiple merchant addresses may be stored by having duplicative records with the same merchant identifier in field 146.

Continuing in FIG. 3A, a table 96 is used for storing consumer information for consumers who interact with the direct marketing system. Records in the consumer information table 96 provide key information about consumers who utilize the direct marketing system. Each consumer has a record in consumer information table 96. Records in consumer information table 96 include a field 154 for storing a merchant identifier which maps to the merchant identifiers used in the other tables discussed above. Records in table 96 further including a field 156 for storing a consumer identifier uniquely identifying a particular consumer. The subsequent fields in consumer information table 96 provide detailed information about the consumer having the consumer identified in field 156. These fields include a name field 158 for storing a textual name for the consumer and a field 160 for storing billing address information for the consumer. A field 162 is used for storing an electronic mail address for the consumer and field 164 is used for storing a telephone contact for the consumer. Additional field 166 is used to store a facsimile address for the consumer. In the illustrated embodiment of the invention, financial information for the consumer, such as the consumer's credit card numbers, are not stored in table 96, for security purposes. In an alternative embodiment to the invention, however, a consumer may wish to store a credit card number in server 12 such that this credit card information does not have to be reentered when additional purchases are made. In this case, an additional field in consumer information table 96 could be established for storing a consumer's credit card information. Multiple credit card numbers could be stored, each one associated with its own billing address information. The final illustrated fields in consumer information table 96 are fields 168 and 170 for storing a login identifier and password for a consumer. These fields are used to validate a consumer's identity as part of the process for direct marketing described in the following figures.

Purchase and shopping cart information table 98 stores information created by a consumer when identifying particular items that are desired to be purchased either at the present or a future time. The fields of a purchase and shopping cart information record include an transaction identifier field 176 for uniquely identifying a particular transaction. Each transaction is provide a unique identifier for later tracking. A field 178 stores a terminal or consumer identifier for a transaction. Where a consumer has an initiated a transaction using the direct marketing system, the consumer's identifier from field 156 of the consumer's consumer information record, is stored in field 178. Additional information relating to the transaction such as the terminal identifier or Internet address used in creating the transaction may also be stored in field 178. Each transaction relates to a particular item and this item is identified by an item identifier in a field 180. The item identifier in field 180 maps to item identifiers in an item information table 104 which is discussed below. Each transaction is further associated with a shipping address which is identified by a shipping address identifier in a field 182. The shipping address identifier uniquely identifies a particular shipping address in the shipping address information table 100 which is discussed below. In addition, each record in the purchase and shopping cart information table 98 includes a field 184 for storing a merchant identifier for storing a merchant affiliated with the transaction. This merchant identifier maps to the merchant identifiers used in fields 120 and 128 of the tables that store merchant information. As will be seen below, merchants are affiliated with consumer transactions that are produced in accordance with some of the methods of the present invention, and this affiliation is established through a merchant identifier stored in field 184. An additional field 185 stores a merchant reference number for transactions. This field is used for those transactions that are consummated at retail workstations in accordance with the process of FIG. 5, for shipment to a merchant and subsequent delivery by the merchant to a consumer. This field may also be used to store reference characters entered by a merchant when the merchant orders items for inventory in accordance with the process of FIG. 6. Additional information regarding the transaction is also available from fields 186, 188, 190 and 192. This information allows financial evaluation of the transaction. The price for the item that has been quoted to the consumer is identified in field 186, and the merchant's cost for the item (i.e, the wholesale cost for the item) is identified in field 188. Applicable taxes are identified in field 190 and quoted shipping costs are identified in field 192. A field 194 stores various status flags for identifying the status of the transaction. Among other status indications, a transaction may have an "initialized" status flag, indicating whether the transaction has been fully initialized by the consumer. A transaction may also have a "shipped" status flag, indicating whether the item has been shipped to the consumer. A transaction may further have a status flag indicating whether or not a partial profit distribution has been made to the affiliated merchant for the transaction in accordance with the principles of the present invention. A field 196 in a purchase and shopping cart information table 98 stores a check number identifying a particular check that was used to provide such a payment to a merchant. A field 198 stores an invoice identifier identifying a shipping invoice reflecting shipment of the purchased item. Additional field 200 provides various date information, particularly identifying dates on which the status of the record changed as an item was purchased, shipped and an associated partial profit was paid to a merchant.

As noted above, records of transactions utilize shipping address identifiers to identify shipping addresses for those transactions. The shipping addresses for transactions are stored in shipping address information table 100 (FIG. 3A). The fields in the shipping address information table 100 provide sufficient information to completely define a shipping address for a transaction. These fields include a field 212 for providing a consumer identifier for the consumer associated with the shipping address. A given consumer may have multiple shipping addresses defined within the system; in this situation, multiple records in the shipping address information table 100 will be provided for the consumer. Each record having the same unique consumer identifier in field 212. In field 214 in the shipping address record provides a unique identifier for a shipping address, which field maps to the shipping address identifier used in field 182 of a transaction. A third field 216 in the shipping address information record provides an actual shipping address for the purchased item.

Figure 3B:
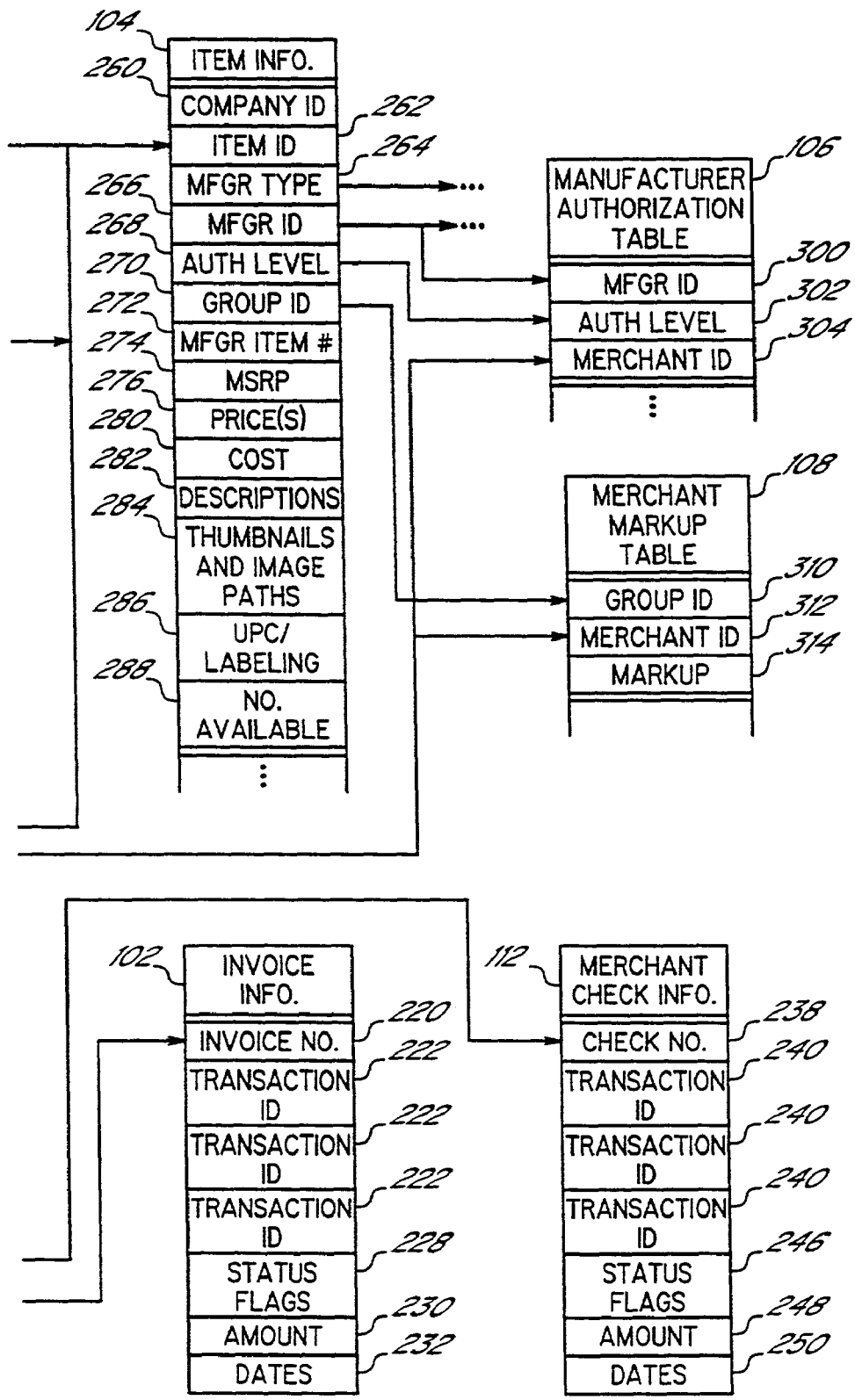

As discussed above, when shipping invoices are created for purchased items, the relevant information for the shipping invoices are placed in an invoice information record in table 102 (FIG. 3B). An invoice information record includes information needed to identify all of the items included in a shipped package. The records include a field 220 having a unique invoice number which maps to the invoice identifier in field 198 of a purchase and shopping cart information record. One shipping invoice may be used to ship multiple items in a single package. Thus, multiple purchase and shopping cart information records may have a common invoice identifier included in field 198. Also, one invoice information record may be linked to multiple purchase and shopping cart information records reflecting multiple transactions, and thus one invoice information record may store multiple transactions identifiers, one for each associated transaction. A field 222 of an invoice information record stores these one or more transaction identifiers. Each identifier relates to one transaction that is described by a purchase and shopping cart information record. The transaction identifier stored in field 222 of table 102 maps to the transaction identifiers stored in field 176 of the purchase and shopping cart information table 98. In the illustrated example, three transaction identifiers are provided in the illustrated invoice information record, indicating that three transactions have been shipped on a single invoice. An additional field 228 of an invoice information record, stores status flags for the invoice information. These status flags indicate various information, such as whether the invoice has been printed, whether the corresponding package and items have been shipped, whether the invoice has been returned, and other possible status of the shipments. A field 230 in the invoice information record identifies the price for the invoice. This price reflects the sum of the cost of all of the transactions that have been shipped with the shipping invoice. A final field 232 identifies relevant dates of the invoice such as the date the package was shipped, the date the invoice was printed and other relevant dates.

As noted above, merchant check information table 112 (FIG. 3B) stores information about checks that have been provided to merchants to pay merchants' partial profits from sales that were consummated with consumers affiliated with those merchants. Merchant check information records include various information for relating a check delivered to a merchant to the transaction(s) involved. The first field 238 stores a check identifier number, which maps to a field 196 in a purchase and shopping cart record and is the number of the check that was delivered to the merchant. As will be noted below, checks are delivered to merchants for typically a number of transactions that occur over a time period. Thus, multiple transactions will be associated with the same check number in a field 196. Similarly, a single merchant check information record will be associated with multiple transaction identifiers, one for each transaction that is related to the check. A field 240 in a merchant check information record stores the one or more transaction identifiers which map relate to the identified check number. These transaction identifiers map to the transaction identifiers stored in field 176 of purchase and shopping cart information records. Typically a plurality of such identifiers are included in a merchant check information record, reflecting that the check is payment for partial profits for a number of transactions. A field 246 in a merchant check information record provides status flags indicating the status of merchant check, and may have various status indications such as printed, mailed, and cleared, respectively indicating that the check has been printed, mailed and then subsequently cleared through the bank system. A field 248 identifies an amount of the check and field 250 identifies dates of the check such as the dates the check was printed, mailed and cleared through the banking system.

Continuing on FIG. 3B, storage of information relating to particular items for sale can be discussed. Specifically, item information table 104 stores records each relating to an item that is sold using the direct marketing system. There is one such record for each item, identifying relevant information necessary to order the item from manufacturers and to provide pricing for the item to merchants and to consumers. The first field 260 in an item information record stores a company identifier which may be used to identify items that are sold by different legal entities utilizing the direct marketing system. If multiple legal entities utilize the direct marketing system to sell items to consumers and merchants, the company ID can be used to distinguish items sold by each entity. As is noted below, the system of the present invention may be utilized by a wholesaler to manage the sale of goods to merchants, and to manage the direct shipment of goods to consumers in affiliation with merchants or to fulfill consumer orders that have been taken by a merchant. Different legal entities may be formed to perform these different transactions. For example, transactions that are conducted directly with the consumer (i.e., shipments of goods directly to consumers with merchant affiliation) may be performed by a different legal entity than transactions conducted with merchants (i.e., shipments of goods to merchants for consumer pickup, or shipments of goods to consumers in fulfillment of merchant orders). A second field 262 in an item information record provides an item identifier for the item to which the record relates. This item identifier is used in other records such as purchase and shopping cart information record, field 180, to cross-reference items using a unique identifier code. A field 264 stores a manufacturer type code and a field 266 stores a manufacturer identifier. These fields collectively provide a type of manufacturer and an identifier for a particular manufacturer, which can be used to select items manufactured by particular kinds of manufacturers (e.g., foreign or domestic, etc.) and to provide detailed information on the manufacturer of a particular item. Each of these fields cross-reference to additional tables not shown in FIG. 3 which provide details on manufacturer types and details on manufacturer identities, such as addresses and other useful information. A field 268 provides an authorization level for an item. As will be discussed in further detail below, a manufacturer may associate an item produced by that manufacturer with one of a unlimited number of authorization levels. This may be done to insure that only those merchants authorized to sell particular items made by a manufacturer, will be able sell those items through the direct marketing system. A manufacturer authorization table 106 (FIG. 3B) which is discussed below identifies the authorization levels applicable to each merchant, thus enabling server 12 to determine whether a particular manufacturer is authorized to carry a particular item. A field 270 in an item information record supplies a group identifier for an item. Group identifiers are used to categorize all items in the item information record table into one of a number of groups. These groups are utilized by merchants to specify pricing markup levels for groups of items, to simplify the process of specifying pricing markups. Pricing markups established by each merchant for each group are stored by a merchant markup table 108 which is discussed in detail below. A field 272 in an item information record provides a manufacturer item number which can be used to identify an item using a part code of the manufacturer. In field 274 stores a manufacturer suggested retail price for an item which may be used providing detailed quotes for an item price to consumers and/or to merchants. A field 276 stores a wholesale price for an item to be charged to merchants when merchants purchase the item. As noted above and further detailed below, consumer purchases of items are priced in accordance with the wholesale price described in field 276, enhanced by a merchant markup that is identified in merchant markup table 108 (FIG. 3B) or in alternate/exception/search information table 110 (FIG. 3A). A field 280 in an item information record provides a cost for an item, typically the price that the manufacturer charges for the item. This information can be used for accounting purposes to determine wholesale profits earned when items are sold to consumers or merchants. Field 282 includes text describing a particular item, for use in detailing the item on screen displays and printouts. A field 284 provides Internet or server file system paths that can be used to retrieve thumbnail or complete image data for an item. This is used when displaying information on an item to a consumer in connection with catalog shopping in accordance with the principles of the present invention. In field 286 in the item information record table provides universal products code (UPC) and labeling information for the item, useful when search for an item based on its UPC or labeling. A final field 288, which is used in various aspects of the present invention, stores a number of items available. This field indicates the number of items that are currently in stock with the entity managing the direct marketing system. Through the use of this field, and its consistent updating as consumer and merchant purchases are received, a direct marketing system in accordance with the principles of the present invention can minimize or eliminate back orders of items and thereby enhance customer service.

As noted above, manufacturer authorization table 106 (FIG. 3B) stores information needed to identify whether a manufacturer has authorized a particular merchant to carry a particular item. Specifically, this table includes a field 300 providing a manufacturer identifier for a particular manufacturer, a field 302 storing an authorization level for that manufacturer and a field 304 providing a merchant identifier. An entry in the manufacturer authorization table 106 indicates that a specific manufacturer has granted a specific authorization level to a specific merchant. In order for a merchant to be able to sell an item having an authorization level specified in field 218 of the item information table, that merchant must have a record in the manufacturer authorization table 106 with its merchant ID in field 304, the manufacturer ID in field 300 and the needed authorization level in field 302. It will be appreciated that a manufacturer may establish any number of authorization levels for its products. Furthermore it will be understood that a merchant may have authorization for particular products for a manufacturer and may not have authorization for other products of that manufacturer. In order for a merchant to have authorization for all products for a manufacturer, there must be a record in the manufacturer authorization table 106 identifying the merchant and manufacturer, for each authorization level established by the manufacturer. Thus if a manufacturer has established three authorization levels for its product line, in order for a merchant to be authorized to sell all of the products in the manufacturer's product line, there must be three records in the manufacturer authorization table 106 each identifying the merchant's ID, the manufacturer's ID, and each respectively identifying each of the three respective authorization levels established by the manufacturer. It will be appreciated that this arrangement of information provides complete flexibility to a manufacturer to specify particular merchants with particular authorizations to sell particular products.

As discussed above with reference to the item information table, a merchant markup table 108 (FIG. 3B) is used by merchants to specify markups for products in a group fashion, thus simplifying the process for establishing markups. Each record in the merchant markup table 108 identifies a particular item group and a particular merchants markup for that group. A field 310 in a merchant markup table record stores a group identifier for a particular group, a field 312 stores a merchant identifier for a particular merchant, and a field 314 stores a markup that the merchant identified in field 312 has established for items which are in the group identified in field 310. It will be appreciated that each merchant must have a merchant markup table record for each group that has been defined and used in item information records in table 104. It is anticipated that the groups will be defined by the entity operating the direct marketing system and these groups will be used in identifying products to merchants, to permit merchants to specify specific markups for each particular group, so that a record may be created for the merchant for each group, with the appropriate markup level.

A final table illustrated in FIG. 3A is an alternate/exception/search information table 110. This table is used to provide special information which cannot be fitted into the format of the item information table 104 and/or merchant markup table 108. Records in the alternate/exception/search information table 110 can provide two different kinds of exception information. A record in this table may provide a keyword to be used for searching for an item that is different than the keywords in the item information table 104. A record in this table may also provide an item specific markup that deviates from the markup established in the merchant markup table 108 for an item's group. Each record in the alternate/exception/search information table 110, two of which are shown in FIG. 3, includes a field 316 identifying a type for the record. This field may indicate that the record provides additional keywords for searching an item, may indicate that the record provides an item specific markup for an item, or may indicate that the record provides other information for an item. A record that provides an alternate search keyword will store the alternate search keyword in a field 318. The alternate search keyword may be a foreign word or foreign language description that is equivalent to the description found in field 282 of the item information record for the item found in table 104. The keyword may also be other alternate terms or part numbers used for an item in the trade not reflected in the item information table 104. The keyword stored in field 318 is associated with an item by an item identifier stored in field 320 and is associated with a merchant identifier stored in field 322. Thus a particular merchant may establish an item specific keyword by creating an alternate/exception/search information record storing the keyword in field 318 and storing the item identifier in field 320 and the merchant's identifier in field 322. A record of this kind will cause a search for the keyword that is being performed for the particular merchant to find the item, while searches for the same keyword performed for other merchants will not find the item. A second record shown in FIG. 3 is of the type that provides a merchant specific item markup. In a record of this type, field 318 is not used. However a field 324 is used to store a specific markup for an item. The markup for a particular item is associated with the item by storing the item identifier in field 320 and storing a merchant identifier in field 322. When the item information table 104 and the merchant markup table 108 are searched to determine the markup established by a merchant for a particular item, the alternate/exception/search table 110 is also searched to determine whether there is an item specific markup for the item. If there is no item specific markup established by a record in the alternate/exception/search information table 110, then the group identifier for the item in the item information table 104 is used to select a group markup for the merchant from merchant markup table 108 to thus derive the appropriate markup for the item. If there is an item specific markup stored in a record in alternate/exception/search information table 110, then this item specific markup is determined to be the markup for the item.

Figure 4A:
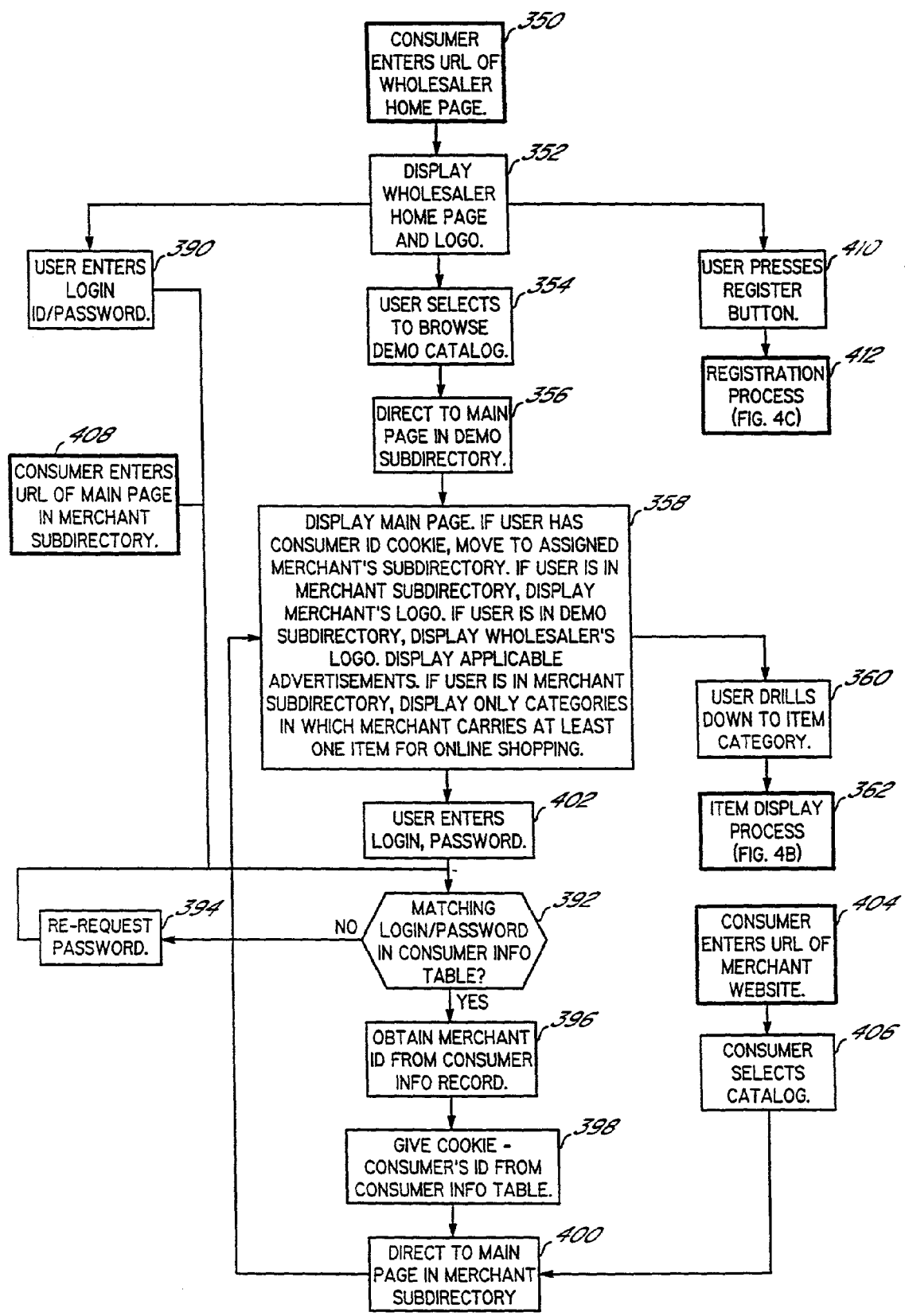
FIG. 4A is a flow chart of the process performed by the server of FIG. 1 interacting with a consumer to present the introductory pages of a catalog of items available for purchase and to permit a consumer to login to the server to make purchases.

Referring now to FIG. 4A, the process carried out by server 12 interacting with a consumer seeking to purchase goods from a direct marketing system can be explained. In the first step 350, a consumer enters the internet address or URL of the home page of a wholesaler that is operating the direct marketing system and server 12. Normally consumers do not directly transact business with wholesalers and in the present embodiment the specific identity of the wholesaler sponsoring the direct marketing operation is shielded from the consumer. For example, a separate business entity and a separate trademark and business image is created for the online delivery of goods to consumers using server 12. This online identity is conveyed by the home page established by the wholesaler and available to the consumer. Typically, a suitably memorizable Internet address such as "www.ejewelry.com" is used for the wholesaler home page.

In response to entering the Internet address of the wholesaler's home page, the wholesaler's home page and logo are displayed in step 352. The wholesaler's home page, as is conventional, provides buttons or click areas that allow the user to select several options for viewing additional pages. Three of these options are particularly relevant to the browsing and sale of goods in accordance with principles of the present invention.

A first option available to a user, typically selected by a user who has not previously been exposed to the system, is to browse a demonstration catalog by pressing an appropriate button or click area in step 354. When the user takes this action, the user is directed to a main page in a subdirectory on the server 12, where a demonstration catalog is provided. This subdirectory is known as a demo subdirectory because it is used for displaying demonstration catalogs to consumers. As will be discussed below, consumers are not able to view pricing in the demonstration catalog, but only can view the catalog of items. Item prices can be viewed, and items can be purchased, only after a merchant affiliation has been established.

In step 356 the user is directed to the main page in the demo subdirectory and then in step 358 this main page is displayed. In step 358, various steps are taken to determine the manner in which the main page in the subdirectory is to be displayed. The main page generally displays a list of product categories, from which the user may drill down to product categories and subcategories to eventually view and select and item, as is described below.

As part of setting up for display of the main catalog page, the user's computer is queried to determine if it has a temporary file known as a "cookie" storing information to be used by server 12. As noted below, a user will receive a cookie only after being affiliated with a merchant through the procedures described below. Unaffiliated users who do not have cookies, are not permitted to purchase items, and instead can only browse the demo or a merchant's subdirectory. Thus, in step 358 if a consumer/user has a consumer cookie then the consumer is redirected to a subdirectory for the assigned and affiliated merchant identified in the cookie. If the user's computer does not have such a cookie then the user remains in the demo subdirectory.

A second step taken in displaying the main page in step 358 is to determine whether the user is in a particular merchant's subdirectory. If the user has been moved to a particular merchant's subdirectory then that merchant's logo is displayed. If, however, the user is in the demonstration subdirectory then the wholesaler's logo is displayed in the place of a merchant logo.

It is anticipated that sponsors may wish to purchase advertising space on catalog pages displayed via server 12. Accordingly, in step 358 any applicable advertisements that have been purchased are displayed along with the merchant's or wholesaler's logo. It is anticipated that these advertisements may involve promotions for particular items for sale that a manufacturer wishes to promote.

It is also anticipated that different merchants affiliated with the direct marketing system will carry different items in their respective catalogs. For example, different merchants may have different authorizations from manufacturers to carry particular items. Also, different merchants may not wish to carry the lower end or the higher end of a particular manufacturers' line, or may not wish to carry goods of particular manufacturers. Thus, in step 358, if a user is in a merchant's subdirectory, then only those categories for which that merchant carries at least one item for online shopping are identified on the main page.

It will be appreciated that the direct marketing system when operated by a wholesaler, may be able to display categories of items and particular items for a wide variety of merchants where no two merchants may have exactly the same catalog of items carried. This is achieved using the database structures described above, by selecting for a particular merchant only those items for which a merchant has the authorization level that was established by that item's manufacturer.

After displaying the main page of a merchant or demo subdirectory, the user is presented with a variety of buttons and click areas through which the user may select particular options for further browsing. These options may include viewing promoted items that are displayed in advertisements, and potentially transferring to advertisers' Internet locations, as well as other options. The options of interest for principles of the present invention are illustrated in FIG. 4A. In the first of these options, in step 360 the user selects a listed category to drill down to a display of that category.

Figure 4B:
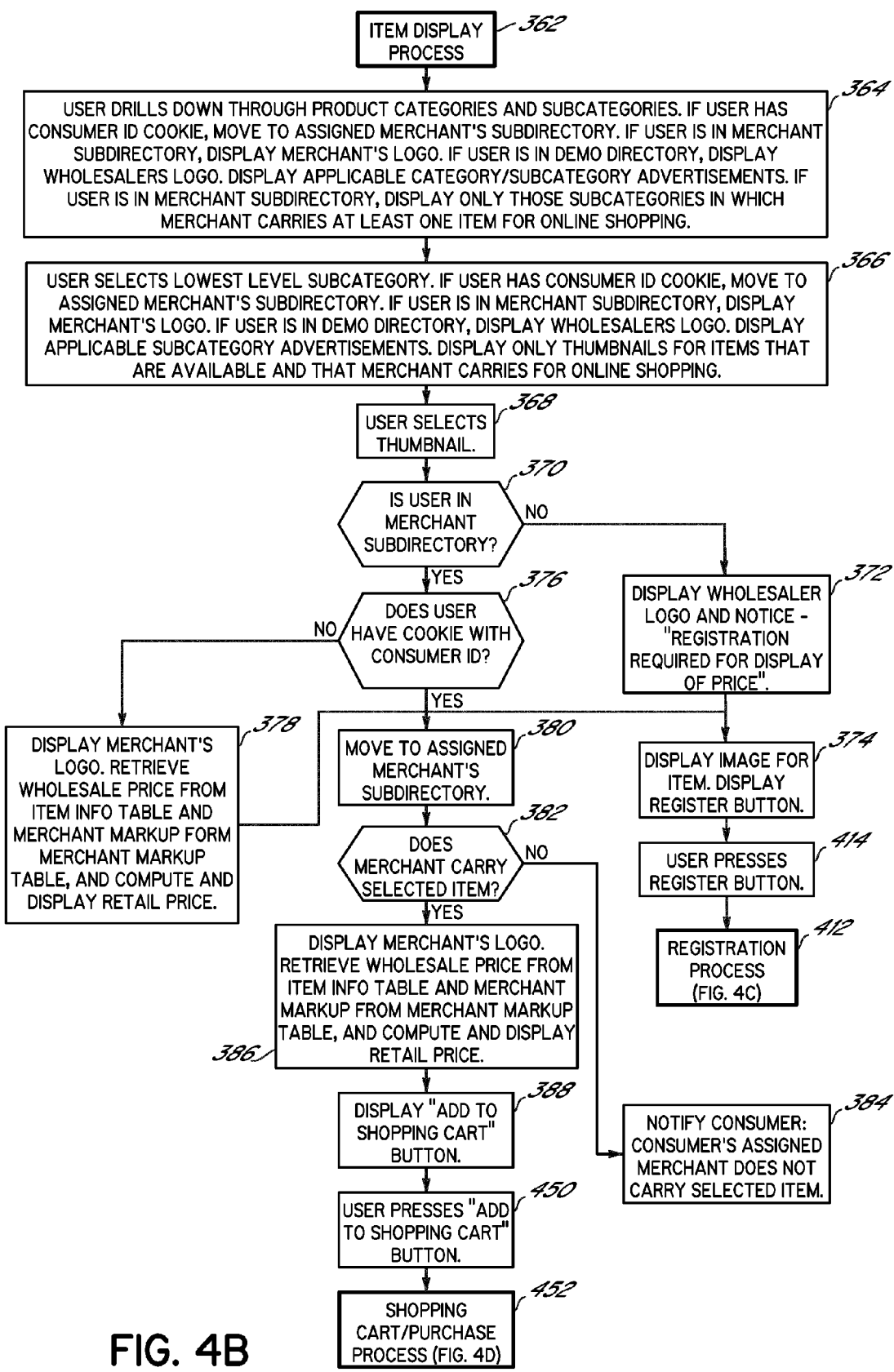
FIG. 4B is a flow chart of the process performed by the server of FIG. 1 interacting with a consumer to display particular items available for purchase and to initialize the purchase process.

Referring now to FIG. 4B, the display of a category and subcategories of items can be explained. When, after the main catalog page is displayed, the user drills down through to a category, and to subcategories, multiple pages showing product categories and subcategories are displayed (step 364). In each of these drill-down operations, several evaluations are made to determine what information should be displayed to the user and what further options should be available.

As the user drills down through the product categories and subcategories, it is determined at each step whether the user has a cookie with a consumer ID. If the user has such a cookie then the user is moved to the subdirectory of the affiliated merchant that has been associated with the consumer. If the user is in a merchant subdirectory, then the merchant's logo is displayed, otherwise the wholesaler's logo is displayed, as discussed above.

On each category and subcategory page, applicable category and subcategory advertisements are displayed. It will be appreciated that advertisers may wish to promote particular items only in connection with those customers who wish to view items in the same product category. For example, a watch manufacturer may wish to display particular watches in advertisements when users have selected the watch category for browsing. Thus, advertisements that are displayed by the system may be displayed in specific category and subcategory pages. In addition, advertisements may only be displayed when a user is in a merchant's subdirectory for a merchant that carries the advertised merchandise.

In step 364 if a user is in a merchant subdirectory, as noted above, only those subcategories in which the merchant carries at least one item for online shopping will be displayed. Thus, in the category and subcategory level, the catalogs displayable by merchants are customizable at whatever level of granularity is desired.

As the user drills through product categories and subcategories, ultimately in step 366 the user selects the lowest level subcategory for a particular line of goods. When this occurs in step 366, particular steps are taken to display items that are for sale in that subcategory. First, again, if the user has a cookie with a consumer ID number then the consumer is moved to the affiliated merchant's subdirectory that has been assigned to the consumer. If the user is in a merchant's subdirectory then the merchant's logo is displayed, otherwise the wholesaler's logo is displayed. When the user views the lowest level subcategory then particular subcategory advertisements may be displayed if applicable. Furthermore, using the data structures described above, thumbnails for those items that are available and that the assigned merchant carries for online shopping are retrieved and presented to the user.

As noted above, some items in the catalog may be out of stock and thus unavailable for purchase at a given time, and some merchants may not be authorized to carry certain catalog items for on-line shopping. To determine whether a particular item is in stock, the item information table is consulted to determine whether field 288 of the record for the item indicates that the item is in stock. If an item is not indicated to be in stock in the item information table, a thumbnail for the item is not displayed and the consumer is unable to purchase the item.

To determine whether a particular item in a subcategory is authorized for on-line sale by a merchant, the manufacturer ID and authorization level for the item are retrieved from the item's information record, and the merchant authorization table is scanned to determine whether there is a record in this table reflecting that the merchant has the necessary authorization level for the manufacturer of the item.

It will be appreciated that in this and other similar thumbnail displays described below, in some cases there may be more items than can be easily displayed on a computer screen, in which case the lowest level subcategory may be displayed in multiple pages, each of which allows display and viewing of an appropriate number of thumbnails, and movement to a prior or subsequent page displaying additional thumbnails.

Thus, once in the lowest level subcategory, the user may view thumbnails of a variety of products in that subcategory and ultimately select, in step 368, a product thumbnail for detailed viewing. Once a thumbnail has been selected for viewing, the manner in which the product is displayed must be determined based upon various factors. Specifically, in step 370 it is determined whether the user is in a merchant's subdirectory. If the user is in a merchant's subdirectory then the user will be able to see pricing for the item which is shown in the selected thumbnail. If the user is not in the merchant's subdirectory then pricing will not be displayed. In this case, in step 372 the wholesaler's logo is displayed and a notice is presented indicating that registration is required for display of a price. As will be discussed below, the registration process causes a consumer to become assigned to an affiliated merchant, and causes the consumer to be transferred to the assigned merchant's subdirectory, so that pricing is always displayed, and purchases are always made, in affiliation with a merchant.

In addition to displaying the wholesaler logo and the registration notice, in step 374 the image for the selected item is displayed as well as a register button which can be pushed to register a consumer with the server 12 and thus become eligible to make purchases of items.

Returning to step 370, if the user is in a merchant subdirectory, then in step 376 it is determined whether the user's computer has a cookie with a consumer identifier in it. If not, the user is permitted to view the pricing for the selected item that has been established by the merchant but may not purchase the item without registering. Accordingly, in this case in step 378 the merchant's logo is displayed and a retail price established by the merchant is determined by retrieving the wholesale price from the item info table, retrieving the merchant's markup from the merchant markup table or from the exception table, and computing and displaying the retail price. Processing then continues to step 374 where the image for the item and the register button are displayed so that the user may register to make a purchase for the item.

Returning to step 376, if the user is in a merchant subdirectory and has a cookie with a consumer ID, then the user is registered for making purchases, and has logged in to server 12. In this case, in step 380 the user is moved to their assigned merchant's subdirectory if the user is not already in their assigned merchant's subdirectory. Then in step 382 it is determined whether the assigned merchant carries the selected item. As noted above, some merchants may not carry all items. A user who attempts to view an item that their assigned merchant does not carry (this may occur if a user directly types the Internet address (URL) for an item rather than browsing through the web pages), will not be allowed to make the purchase of that item. Thus, if the merchant assigned to a consumer does not carry the selected item, then in step 384 the consumer is notified that their assigned merchant does not carry the item. If the consumer's selected merchant does carry the selected item, then in step 386 pricing for the item is displayed along with the merchant's logo. Here again, the pricing is determined from the wholesale price in the item info table and the merchant's markup identified in the merchant markup table or in the exception table. In step 388 an add to shopping cart button is displayed to the user indicating that the user is able to initiate a purchase for the item by adding it to a virtual shopping cart for that user.

Returning now to FIG. 4A, it was noted that a user viewing the wholesaler's home page may elect to take actions other than browsing a demonstration catalog. Specifically, a user that has previously established a login and password through the registration process, may in step 390 enter the login and password to log into server 12. If this step is taken, then processing continues to step 392 in which server 12 determines whether there is a matching login and password in the consumer information table. If not, then in step 394 the user is requested to reenter the password. If there is a matching login and password then in step 396 the consumer information table is accessed to find a record having the matching login and password. A merchant's identifier is obtained from this record. In step 398 a cookie is delivered to the consumer's computer with the consumer's identifier so that this cookie may be later used to ensure that the consumer is directed to their merchant's assigned directory. Then in step 400 the consumer is directed to the main page in the merchant's subdirectory and processing continues to step 358 in which the consumer may view the catalog under their assigned merchant's logo and select and purchase items.

As noted above, users may also arrive at step 358 and view the main page as part of viewing a demo catalog. This main page includes a button or click area that allows the user to enter a login and password and thus log into the system. When this is done in step 402, processing continues to step 392 to ensure that this login and password match consumer information table entry, and if so the user is delivered a cookie and allowed to browse the catalog in the manner discussed above.

It can also be seen in FIG. 4A that consumers may enter the catalog of the direct marketing system via links that appear in websites established by merchant affiliates. In this case a consumer enters the catalog by first entering the internet address or URL of an affiliated merchant. While the consumer is viewing the merchant's homepage or another page in the merchant's website, in step 406 the consumer may press a button or click area to view the catalog provided by the direct marketing system. In this case the process continues to step 400 and the user is directed to the main page of the merchant's subdirectory, and then the process returns to step 358 to begin to view the catalog from that merchant's perspective.

It will be further appreciated that consumers who are accustomed to the mode of operation of the catalog, may directly enter the internet address or URL of the main page in the merchant's subdirectory. In step 408 a consumer who enters this internet address is directed directly to step 358 and can view this main page. A merchant seeking to advertise their affiliation with the direct marketing system catalog may advertise their main page address in the merchant subdirectory. Users who receive these advertisements may then directly enter at step 408 to that merchant's main page.

As noted above, a consumer viewing the wholesaler's homepage and logo may have additional options other than those described. Specifically, in step 410 the user may press a button or click area to request registration with the system. This causes the user to transition to step 412 in FIG. 4C which initiates the registration process. The registration process may also be initiated while an item is displayed, by pressing the register button in step 374 of FIG. 4B. It will be noted that other pages may also present the user with a button or click area to allow the user to log into or register with the server 12; only two of the possible places where registration may be initiated, have been discussed herein for exemplary purposes.

Figure 4C:
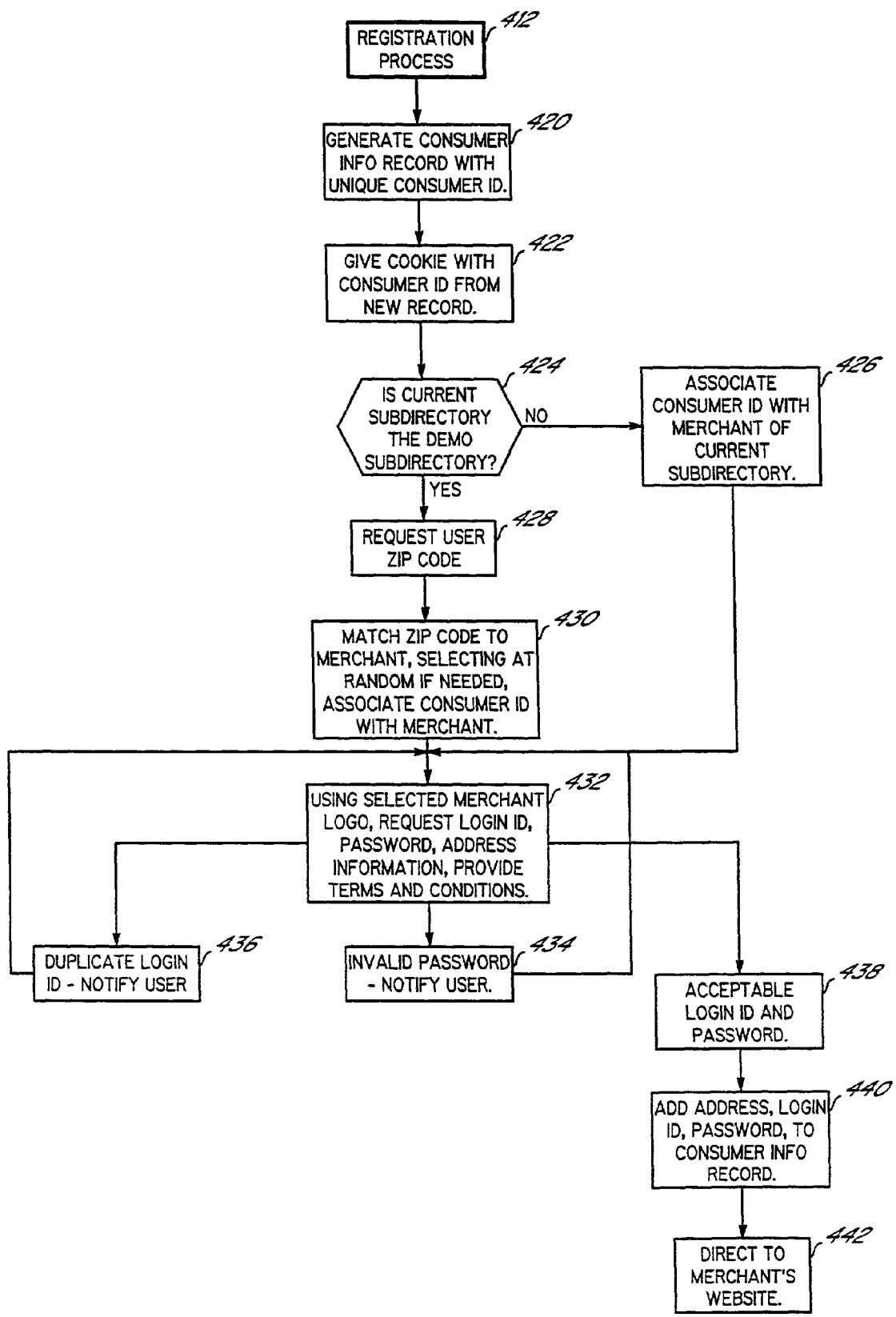
FIG. 4C is a flow chart of the registration process performed by the server of FIG. 1 to register consumers to purchase items and to associate consumers during this registration process with an affiliated merchant.

Once a user has elected to register with the direct marketing system, the user is directed to the registration process and specifically in step 420 of FIG. 4C, a new consumer information record is generated in the consumer information table having a unique consumer identifier. In step 422 a cookie is delivered to the user with a consumer identifier from the new record. In step 424 it is determined whether the user is currently in the subdirectory of a merchant or in the demo subdirectory. If the user is in a subdirectory of a merchant, this indicates that the user is a customer of that merchant and should be associated with that merchant. Thus, in this circumstance in step 426 the consumer information record is updated to associate the consumer identifier assigned to the consumer with the identifier of the merchant of the current subdirectory. If the consumer is not in a merchant's subdirectory when registration is initiated, then the consumer must be assigned to a merchant. This is done in step 428 by requesting the user's zip code and in step 430 matching the user's zip code to zip codes of merchants stored in the merchant address information table. The merchant with the closest to a matching zip code will be assigned to the consumer. If multiple merchants have equally close zip codes, then a merchant is selected at random from among the equally close merchants, and the selected merchant is assigned to the consumer. The merchant that is assigned to the consumer is associated with that consumer by storing the merchant's identifier into the consumer ID record that has been created for the consumer.

After assigning a merchant to a consumer, in step 432 a page is displayed to the user to obtain the user's suggested login identifier and password. The merchant's logo is presented on this page so that the consumer is made aware of their affiliation with the merchant. In addition to a login identifier and password, the consumer must supply address information that can be used in verifying the billing address of the consumer. The terms and conditions of the use of the system, including warranty terms and other policies may be provided on this page so as to be certain that any consumer who registers with the system and makes purchases has been advised of these terms and conditions.

The user may specify an invalid password (i.e., one that is too short or has disallowed characters), in which case in step 434 the user is notified that the password they have selected is invalid, and the user is returned to step 432 to request a password again. The user may also select a login identifier that is a duplicate of a login identifier selected by another user. If this occurs then in step 436 the user is so notified, and processing returns to step 432 so that the user may select a different login identifier. If the login identifier and password selected by the user are acceptable (step 438) then the address login identifier and password that have been provided by the user are stored in step 440 into the consumer's information record. Then in step 442 the user is directed to the website of the merchant to whom they have been assigned. In many cases the merchant's website may be hosted by a server other than server 12, although server 12 may also host merchant websites, in which case the user may not be directed to a different server. Once at the merchant's website, the user may return to view the catalog by activating a button or click are of the merchant's website to view the catalog, as discussed above with reference to FIG. 4A, step 404.

Returning now to FIG. 4B, a user may log into the system and purchase items by arriving at step 388 in which an add to shopping cart button is displayed. If, in step 450, the user presses the add to shopping cart button, then server 12 initiates the shopping cart and purchase process in step 452.

Figure 4D:
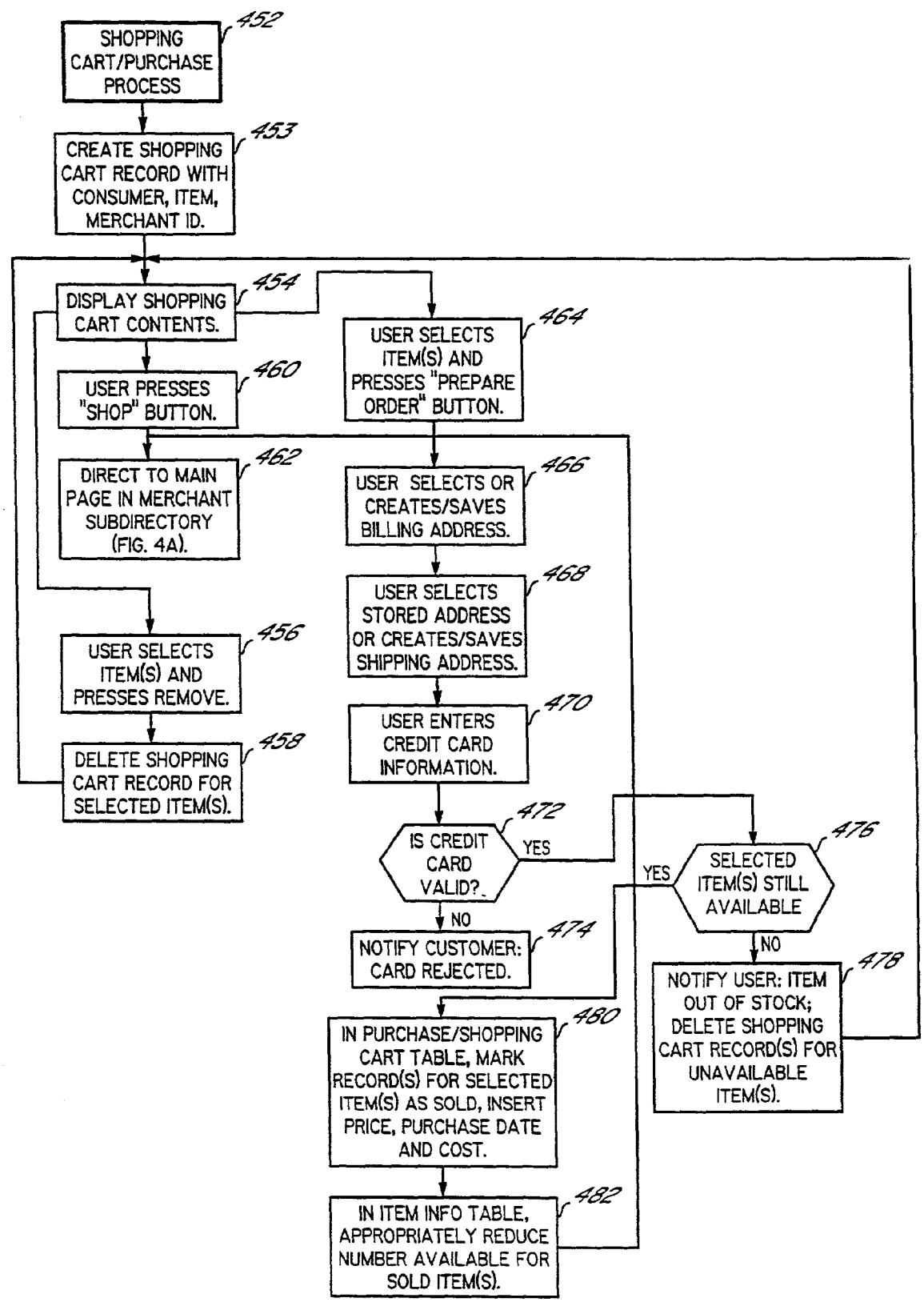
FIG. 4D is a flow chart of the purchase process performed by the server of FIG. 1 including steps necessary to obtain financial and credit information from a consumer, validate the availability of a purchased item and initiate records for the transaction.

Referring to FIG. 4D, in this process, in step 453, a purchase and shopping cart record is created in the purchase and shopping cart table, including the consumer's ID, the item ID and the affiliated merchant's ID. In step 454 the current shopping cart contents for the consumer are displayed. This is done by querying the purchase and shopping cart table to find all records having the consumer's consumer ID and displaying details of the items that are reflected in those records. When viewing the shopping cart contents of step 454, the user may take various actions to purchase additional items, delete items or return to shopping.

If the user elects to remove one or more item(s) from their virtual shopping cart in step 456, the user does so by selecting the item(s) in the display of the shopping cart contents, and pressing a remove button or click area. In step 458, the item is removed from the virtual shopping cart for the selected item. Processing then returns to step 454 to display the shopping cart contents which will now not include the deleted item(s).

If the user wishes to continue to shop after viewing the contents of the user's virtual shopping cart, the user can press a shop button or click area in step 460. When this is done, in step 462 the user is directed to the main page of the merchant's subdirectory-y which will be viewed in step 358 of FIG. 4A as noted above. The user may then continue to browse the catalog and choose additional items to add to their virtual shopping cart.

When a user has decided to purchase one or more items that have been placed in the user's virtual shopping cart, then in step 464 the user will select the item(s) that the user wishes to purchase and press a prepare order button or click area. In response, in step 466 the user is prompted to enter a billing address for a credit card that is to be used for payment. In step 468 the user may select a stored address or create and save a stored address to be used for shipping the item. As noted above, a single user may have multiple addresses stored within server 12 and these addresses will be provided as available choices in step 466 and step 468 so that the user may select a stored address rather than being required to retype addresses. In step 470 the user is asked for credit card information. As discussed above, in the current embodiment the server 12 does not store credit card information, although this information may also be stored in other embodiments.

After the foregoing in information has been entered in step 472 the user's credit card and purchase are evaluated to determine if they are valid. If the user's credit card number is not valid or its billing address does not match the billing address supplied by the user, then in step 474 the consumer is notified that their card has been rejected. If in step 472 the user's credit has been determined to be valid then ill step 476 a determination is made whether the items selected by the consumer are still available. It will be noted that a substantial time delay may occur between the display of an item to the consumer and its addition to a virtual shopping cart, and the decision by a consumer to purchase that item. Indeed, a consumer may leave an item in their virtual shopping cart for a number of days, before that shopping cart record is removed. Thus, it is necessary to determine whether items that were available and selected for purchase by the consumer are still available after the user has provided a valid credit card number. If in step 476 an item selected by the consumer is no longer available, then in step 478 the user is notified that the selected is no longer available and the shopping cart record for the item is deleted. Processing then returns to step 454 to show the revised contents of this shopper's virtual shopping cart without the deleted item. If the items selected for purchase by the consumer are still available then in step 480 the records for the selected items in the purchasing shopping cart table are marked as sold and the purchase price, purchase date and cost are inserted. This information will later be used in building an invoice for shipping the items to the consumer. In step 482, the item information table is updated appropriately to reduce the number of available items for each item that has been sold. This ensures that when items have been sold and are no longer available, other consumers may not purchase those items, thus, eliminating the potential for backordered items, allowing the server 12 to accurately guarantee delivery dates for any items that are purchased by consumers.

Figure 5:
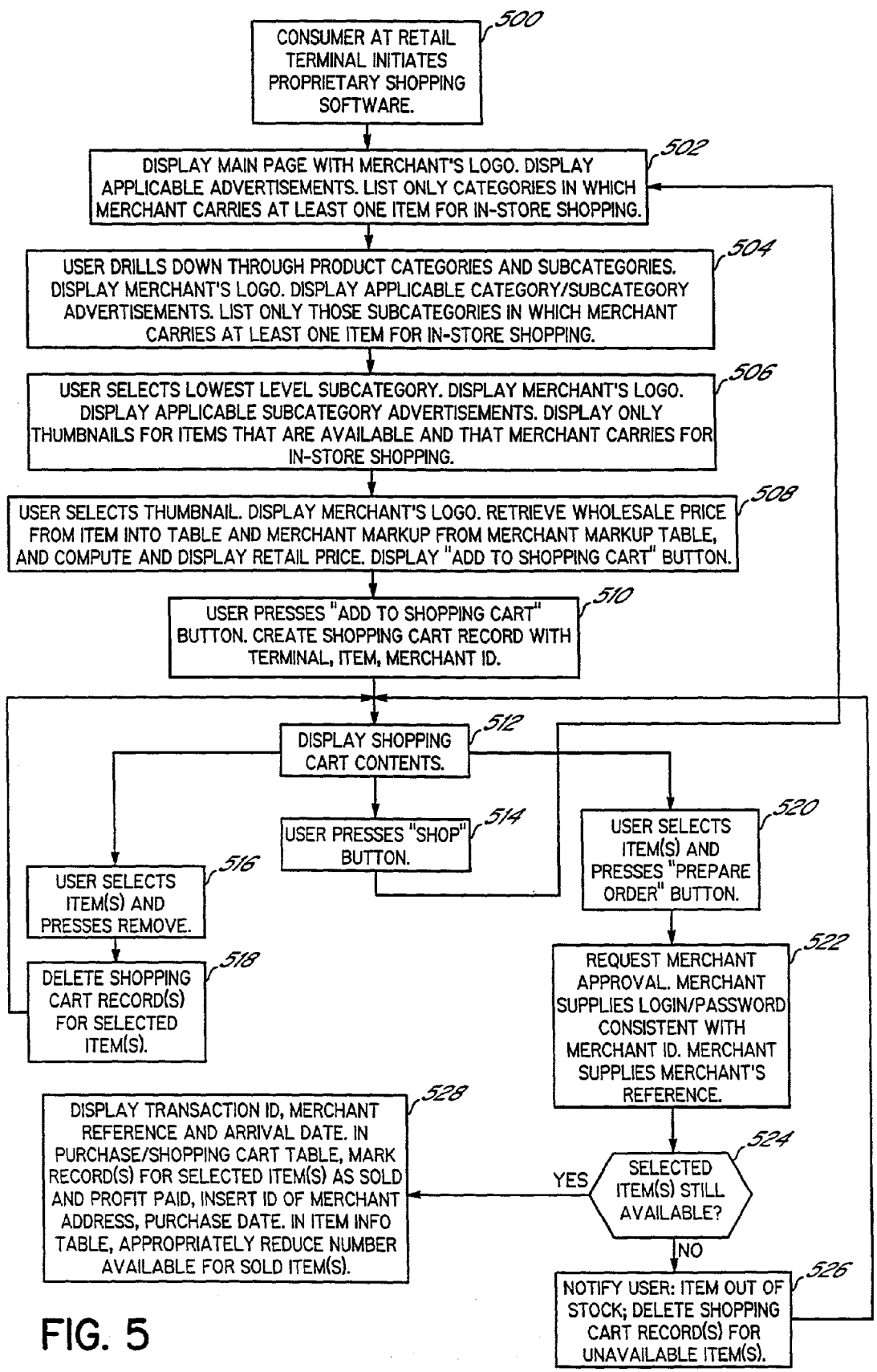
FIG. 5 is a flow chart of a process performed by the server of FIG. 1 interacting with a retail workstation to permit a consumer to browse a catalog of available items an to initiate a purchase of an item from a merchant, upon merchant approval, using the direct marketing system in accordance with principles of the present invention.

Referring now to FIG. 5, the process performed by server 12 of FIG. 1 in directing with the retail workstation 46 to permit customer purchases at a retail site can be described in detail. In this process, in step 500 a consumer at a retail workstation terminal initiates proprietary shopping software stored in area 78 of the mass storage device 52 connected to the terminal 46. The proprietary software initiates an Internet connection the server 12 to facilitate shopping by the consumer.

Online shopping at retail terminal is similar to online shopping that may be performed by a consumer at a private home or other Internet location using a web browser. A catalog of items is displayed to the consumer. The items in this catalog are derived from items authorized for merchant sale. At all times, shopping through a retail workstation is associated with a retail merchant that is responsible for the retail workstation. Thus, unlike consumer shopping performed at private homes or other Internet connected locations, retail shopping in a merchant location is always associated with a single merchant.

It will be noted that the use of retail workstations for consumer shopping at a merchant's retail location, will enhance the sales of products by the entity sponsoring the direct marketing system and managing server 12. Wholesalers that do not provide online shopping through merchant workstations will be at a significant disadvantage in those retail environments where a merchant workstation is available for merchant shopping, as merchants are likely to encourage consumer shopping through the merchant workstation to increase the availability of sales staff and present consumers a complete catalog of items that is larger than the inventory of items that may be available in the merchants retail store at any given time. In view of the prospect of increased sales arising from the presence of retail workstations at retail sites, the business entity responsible for managing server 12 may as a business method provide suitably configured computer systems to merchants at a reduced price or free of charge to encourage merchants to establish retail workstations that can be used to make online orders from server 12. It is anticipated that the cost of computing systems supplied for this purpose can be readily recouped through enhanced sales that those computer system generate when positioned at a merchant's retail location. Furthermore, merchant goodwill that arises from the sale of computer systems at reduced cost, or giveaways of systems to merchants, is also likely to enhance the business of the entity managing server 12.

It is anticipated that consumers may find a touch screen workstation more intuitive and easier to use in a retail shopping environment than a traditional workstation using a separate mouse style pointing device. Accordingly, it is anticipated that computer systems that are sold to merchant affiliates at reduced prices or given to merchant affiliates will include touch screen enabled monitors 50 that will allow consumers to press areas upon the screen to generate mouse clicks that will cause server 12 to seek for products through the operations for online shopping that are detailed in FIG. 6. The use of touch screens for graphical interfaces to computer systems is well known and touch screen systems for performing this function are commercially available.

Continuing now in FIG. 5 and after the first step where the consumer initiates proprietary software for communicating with server 12, in step 502, a main page is displayed in the retail workstation. This main page includes the logo of the merchant that has the retail workstation in its retail location. Logos for the wholesaler or entity sponsoring server 12 are not displayed on the retail workstation for the reasons that transactions consummated through a retail workstation are directly between the merchant and the consumer as will be seen below.

During display of the main page and subsequent pages, applicable advertisements may be displayed on the monitor of the workstation 46. Here again, manufacturers may be interested in providing advertisements to consumers at retail locations to enhance sales of items sold by the advertising manufacturer, particularly where multiple competing manufacturers have items in the catalog that can be viewed at a retail workstation.

In step 502, further analysis is conducted to insure that retail workstation 46 does not list categories of items in which the merchant does not carry any products. Note, however, that a merchant need not be authorized for on-line sales of products for those products to be offered for sale on a merchant workstation. Rather, the merchant need only be authorized for conventional retail sale of the product. As noted below, shopping using a retail workstation leads to sales transactions that are directly between the merchant and the consumer, and the transaction by its nature requires that the consumer be present at the merchant's retail site to make a purchase. Therefore, a sale through a retail workstation is not an "on-line" sale, and it is not necessary for a merchant to be authorized to carry and sell products online for those products to be listed on a retail workstation at the merchants retail site. Rather all that is necessary is that the merchant be authorized to carry the products for conventional retail shopping. Nevertheless, it may be the case that some merchants may not carry or be authorized to carry all of the products that are available from server 12. Thus, in step 502 an analysis is conducted to ensure that there are items under each category displayed on the main page that are carried by the merchant for in-store shopping. This analysis may be facilitated by establishing at least a base merchant authorization level for every item that is sold by server 12; this base authorization level would indicate merely that the item is authorized to be carried for conventional retail sale by merchant having the base authorization level. A merchant that has this base authorization level in the merchant authorization table will be able to display items from that manufacturer that have the base authorization level, in the retail workstations 46. Merchants who do not have the base authorization level for a given manufacturer will not be able to display that manufacturer's items in a retail workstation 46 at the merchants retail location.

After a main page of a catalog has been displayed, the consumer user may drill down through product categories displayed on the page so that in step 504, categories and subcategories are displayed on the retail workstation 46. As these pages are displayed, the merchants logo is displayed along with applicable category or subcategory advertisements that have been purchased by manufacturer sponsors of the system. In step 504, once again, only those subcategories in which a merchant carries at least one item for in-store shopping will be listed.

Continuing now in FIG. 5, in step 506 the user will ultimately select a lowest level subcategory for viewing of items available for sale. On a page for the lowest level subcategory, as with other pages, the merchants logo will be displayed and any applicable subcategory advertisements will also be displayed. However, on the lowest level page, thumbnails will also be displayed for those items in the subcategory that are available for sale. Only those thumbnails for those items that are available and that the merchant carries caries for in-store shopping will be displayed. Items that the merchant does not carry for in-store shopping, i.e., items in which the merchant is not authorized to sell even in conventional retail shopping, will not be displayed. Furthermore, any items that do not have a quantity available identified in the item information table will not be displayed. As discussed above, this ensures that consumers will not place orders for items that are not available in the inventory of the business entity sponsoring server 12. This in turn ensures that all items that a consumer may order will be immediately available for shipment and can be delivered by guaranteed dates.

In step 508, the consumer user selects a thumbnail for item viewing. A screen or page is produced displaying the merchants logo and displaying the item image. On this page, a retail price of the item is displayed by retrieving the wholesale price from the item information table and merchant markup information in the retail workstation mass storage device, and using these to compute the retail price for the item as well as the shipping cost, which is displayed to the consumer. On this page, an add to shopping cart button is displayed so that the consumer may select the item for purchase.

In step 510, if the user presses the add to shopping care button for an item, in step 510, a shopping cart record is created in server 12 and this record is initialized with the terminal identifier, the item identifier and the merchants identifier. In step 512, the contents of the shopper's virtual shopping cart are displayed. As described above, this entails searching the purchase and shopping cart records to find any record reflecting an initiated transaction for an item having the same terminal identifier. In step 512, all of those items which are reflected in such records are displayed to the consumer as the contents of the consumers virtual shopping cart.

It will be appreciated that upon initiation of a shopping session or upon completion of a shopping session by a consumer at a retail terminal, any purchase and shopping cart records that have been initiated but for which purchases have not been made, are deleted so that any subsequent sessions at the terminal by other consumers will begin with an empty virtual shopping cart. The manner and time in which the virtual shopping cart created by a consumer will be emptied can take various forms. However, two alternatives are to empty the virtual shopping cart of any prior consumers in step 500 when a consumer initiates a new session with server 12. Alternatively, when a consumer makes and completes a purchase in step 528 that is discussed below, any purchase and shopping carts that were not selected for purchase can be deleted at that time.

While the user/consumer is viewing the contents of a virtual shopping cart, the user may be provided with various options for continuing the session. One option may be "continue to shop" button or click area that the user may press to continue to shop for additional items to add to the virtual shopping cart. When a user uses such a button in step 514, the user is returned to step 502 in the main page of the catalog is displayed. An alternative option that may be available is to remove items from the virtual shopping cart. If the user selects one or more items and presses a remove button or click area in step 516, then in step 518 the shopping cart records for the selected item are deleted from the purchase and shopping cart information record in server 12. Processing then returns to step 512 to display the remaining shopping cart contents. A third option that a user may have will be to prepare an order for an item. To do so, the user selects one or more items and presses a prepare order button or click area in step 520.

When a consumer requests a purchase of an order in this manner, the purchase will be consummated by shipment of the purchased items to the merchant sponsoring the retail workstation. The transaction with the consumer will be between the consumer and the merchant. A separate, wholesale transaction will occur between the merchant and the entity sponsoring the server 12. Accordingly, before a transaction can be consummated by a consumer at a retail workstation, the merchant must receive payment for the item or suitable credit for the item and approve the transaction. Thus in step 522, after the user requests to prepare an order for an item, the retail workstation requests approval from the merchant, and a merchant reference. The merchant indicates approval of the transaction by providing a login and password consistent with the merchant's account which are compared to the merchant information record having a merchant identifier for the merchant sponsoring the retail workstation. A merchant login and password must be provided before a purchase can be consummated.

Once an acceptable login and password, and potentially a merchant reference, has been supplied, then in step 524 it is determined whether the items that were selected by the consumer for purchase are still available. This process, performed in step 524, involves checking the item information table in server 12 to confirm that the item selected for purchase is available. As noted above, items that were available at the time a consumer was shopping for items, may no longer be available by the time the consumer has consummated the purchase of those items, due to purchases made by other consumers or by merchants. Thus a second check of availability is required just prior to consummating a sales transaction. If a particular item is found not to be available in step 524, then in step 526, the user is notified that the item is out of stock, and the purchase and shopping cart record(s) for the unavailable item or items is/are deleted. Processing then returns to step 512 and the consumer is provided with a display of the virtual shopping cart contents, which will no longer include the out of stock items.

Assuming that an item is in stock, processing will continue to step 528. In step 528, the transaction identifier from the purchase and shopping cart record, and the merchant reference entered by the merchant, and an arrival date on which the item will arrive at the merchant retail site, will be displayed. It will noted that the arrival date can be accurately computed since the date of shipment will be the date of purchase because all items that are purchased are in stock. This information may be printed or copied by the merchant or consumer as a receipt or claim check for the item when the item is delivered to the merchant. As this information is displayed, server 12 also modifies the purchase and shopping cart records for those items that were purchased to indicate that the items were sold and to indicate that the profits for those items were paid. It will be noted that the items sold through retail workstations have already been profitable for retail merchants because the retail merchant has already collected a retail price from the consumer for the item while paying a wholesale price, and thus no additional profits are paid to merchants for such transactions.

Items purchased by retail workstation are shipped to merchants for delivery to consumers. Therefore, in step 528, the identifier of the merchant's address is inserted into the purchase and shopping cart record so that the items are shipped to the merchant. The purchase date of the item is also inserted. In the item information record table, upon sale of an item the number of available items is immediately reduced so that the item information table reflects that the items have been sold and are no long available for sale to other consumers.

It will be appreciated that merchants can charge a shipping cost for items that are sold through retail workstations. Although normally retailers do not charge shipping for items purchased from catalogs of wholesalers, the unique concept of the retail workstation may be seen as consistent with charging shipping costs to consumers. Any shipping cost that a merchant wishes to charge may be displayed in step 522 at the time a transaction for the items is to be consummated. The shipping costs will be reflected in the total cost stored in field 192 of the purchase and shopping cart information record for the item. It will be noted, however, that only the shipping charges that are actually incurred, will be charged to the merchant. As described below in FIG. 8, if multiple purchases are made by a merchant or by consumers by retail workstation in a single day, these purchases will be shipped together in a single package, and subject to a single shipping charge. Thus a merchant may make profits on shipping charges charged to consumers if multiple items are shipped in a single package for delivery to multiple consumers. This additional profit enhancement is believed to be a further enticement to merchants to participate in the direct marketing system in accordance with the principles of the present invention.

Figure 6:
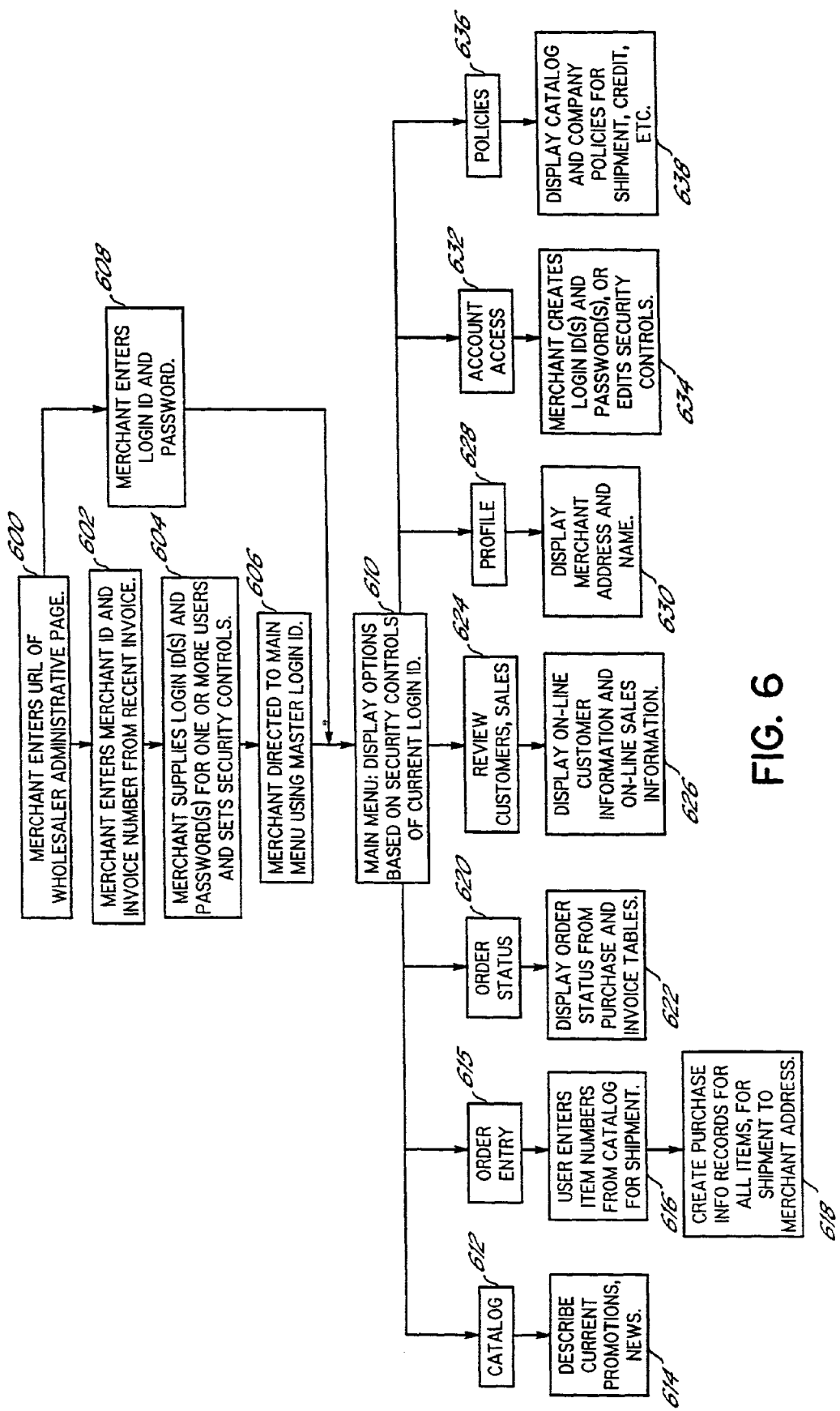
FIG. 6 is a flow chart of a process performed by the server of FIG. 1 interacting with a merchant workstation to permit a merchant to order items, view the status of an account, and administer an account of the merchant.

Referring to FIG. 6, the process performed by a merchant at a merchant workstation 32 can be described. In a first step 600, the merchant enters the Internet address or URL of the administrative page established by the wholesaler or other business entity that is managing server 12. At this administrative page, the merchant may log in to server 12 using an existing login and password, or set up an account for future use. To set up an account, in step 602 the merchant enters a merchant identifier and invoice number that can be found on any recent shipping invoice for items shipped to the merchant. Server 12 verifies the merchant ID and invoice number supplied by the merchant to confirm the merchant's identity. Then in step 604, server 12 prompts the merchant to supply a login identifier and password that the merchant wishes to use for future accesses to server 12. The merchant may supply a single login ID and password, or may supply multiple login IDs and passwords for multiple users that the merchant wishes to allow access to server 12. The merchant may set up a master login ID and password, and one or more supplementary login IDs and passwords. The supplemental login IDs and passwords may have limited rights, for example, employees of the merchant may be allowed to view existing orders of merchandise but not place orders, or some employees may be allowed to place orders but may not be allowed to adjust the security controls of all users. After the merchant sets up one or more login IDs and passwords, then in step 606 the merchant's workstation is directed to the main menu and the main menu is displayed using the merchant's master login identifier.

Returning now to step 600, after a merchant has established an account with server 12, the merchant may proceed directly to the main menu by in step 608 entering a login identifier and password. These are validated by server 12 and if they are valid, then the main menu is displayed.

The main menu displayed to a merchant in step 610 provides the merchant with various options which the merchant may invoke. The options that are displayed to a particular user, are determined from the security controls applied to the login identifier provided by the user upon login. Typically a merchant will have a master login identifier which will have complete rights to perform all functions described in FIG. 6, and may have one or more supplementary identifiers that will have limited rights, as discussed above. The various options that may be invoked from the main menu based upon the security controls applicable to the login ID are enumerated below.

A first action 612 that may be initiated is a view of the current catalog information from the entity sponsoring server 12. By selecting this option, in step 614 server 12 delivers, for display to the merchant, current promotional information, current news and other newsletter type information.

The second option that a merchant may select is order entry 615. When a merchant selects this option in step 615 the merchant user may enter item numbers for particular items in the catalog of items available through server 12, and may request shipment of those items to the merchant. It is anticipated that the business entity managing server 12 may produce a printed catalog as well as manage an online catalog, so that merchants may use the printed catalog in a conventional manner to identify item numbers for items that the merchant wishes to add to its inventory. These item numbers are entered in step 616 to create an order for items. When an order for items is created in step 618, purchase and shopping cart information records are created for each item that has been ordered, such that those items will be shipped to the merchant's address.

An additional option that a merchant may select is to view order status 620. When a merchant selects this option, then in step 622 the status of all orders placed by the merchant are displayed by collecting information from the purchase and shopping cart records and invoice records accessible to server 12. It will be noted that because merchants are allowed to order all items in the catalog by item number, merchants are not precluded from ordering items that are not currently in stock. Thus, merchant orders may create backorders which are filled when items arrive to inventory of the entity sponsoring server 12. Merchants may continuously monitor the status of such backorders by the use of the order status option 620.

An additional option a merchant may select is to review customers and sales in step 624. When this option is selected, in step 626 the merchant may view information on online customers, i.e., those consumers who have been assigned to the merchant through the process described above with reference to FIGS. 4A through 4D. The merchant may review the customer name and address information and may use this information to send postcards, catalogs or fliers to online customers to encourage their further use of the system or visits to the merchant's retail site. The merchant may also view sales information for sales to online customers consummated through the online system to determine which customers are potentially good prospects to solicit for further sales.

A further option that a merchant may select from the main menu is to view the merchant's profile in step 628. This option causes the server 12 to display the merchant's current address and name information stored in the server, and allows the merchant to edit this information if it has changed.

A further option that a merchant may select from the main menu is to change account access parameters in step 632. When this option is selected, in step 634 server 12 displays to the merchant the current login IDs and passwords that have been established for users, and permits the merchant to create additional login IDs and passwords or edit the security controls assigned to existing login IDs and passwords, or delete login IDs and passwords.

A further option that a merchant may choose from the main menu is to change company policies in step 636. When this option is selected, in step 640 server 12 will display current policies regarding shipping costs, credit terms available to the merchant, current manufacturer authorizations for sales of items online and through retail workstations, and any other parameters of this kind that are established and stored by server 12.

Figure 7:
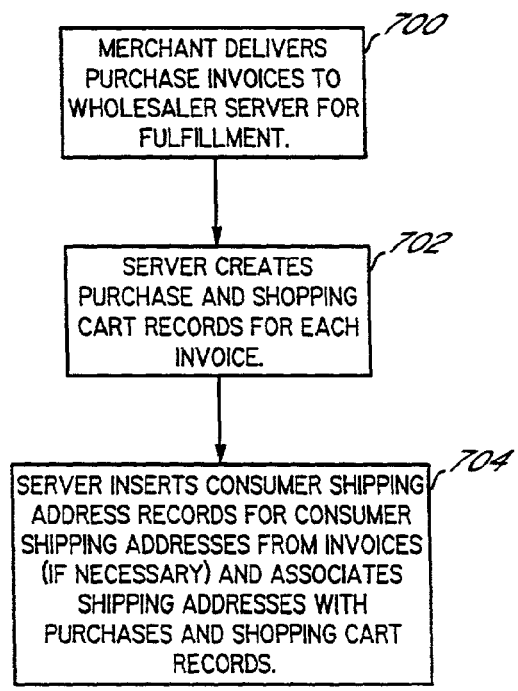
FIG. 7 is a flow chart of the process performed by the server of FIG. 1 interacting with a merchant to receive consumer orders taken by the merchant to be fulfilled by direct shipment.

Referring to FIG. 7, a process in which the entity managing server 12 can perform fulfillment for merchants is described. In a first step 700 a merchant seeking fulfillment of orders delivers purchase invoices, in an electronic form, to server 12. In step 702 server 12 uses these invoices to create purchase and shopping cart records for each invoice including an identification of the items to be shipped and the purchase price and other information available from each invoice. Subsequently in step 704 server 12 inserts consumer shipping address records for those consumer shipping addresses identified in invoices that are not already identified in the consumer information database. These consumer shipping addresses are then associated with the purchase and shopping cart records for items to be shipped to those consumers. Shipments will thus be made directly to the consumers in fulfillment of the merchant invoices delivered in step 700.

Figure 8:
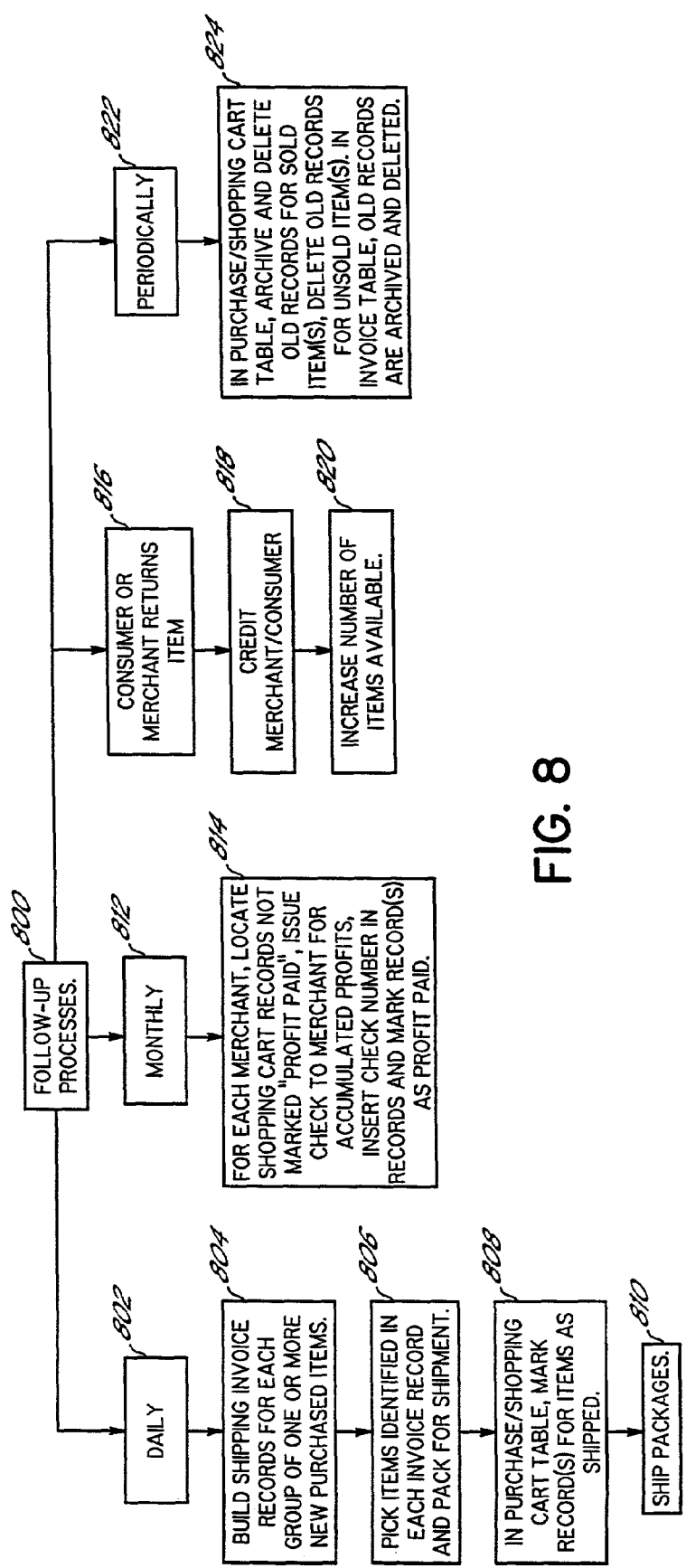
FIG. 8 is a flow chart of follow-up actions taken by the server of FIG. 1 to ship orders that have been received, to issue partial profits to merchants entitled to such partial profits through affiliation with transactions performed by the server of FIG. 1, to handle returns and to age incomplete transactions.

Referring now to FIG. 8, various follow-up processes 800 are conducted on daily, monthly or periodic bases. On a daily basis 802, a process is performed to ship items purchased during the previous day, to their respective destinations. In this process, in step 804, shipping invoice records are created for each group of one or more new purchased items that are described by purchase and shopping cart records. Once an invoice has been produced, it is printed and in step 806 a human or automatic system is used to pick the items identified in each printed invoice and pack those items in a suitable container for shipment. Then in step 808, those items that have been shipped and invoiced are marked as shipped in the purchase and shopping cart table. At the same time the corresponding invoice records are marked as shipped. Finally, in step 810 the packages that have been created are shipped to their respective shipping addresses.

On a monthly basis or other suitable time period 812, a process is performed to pay partial profits to merchants for items sold online directly to consumers by the direct marketing system. In this process, step 814, for each merchant, server 12 locates shopping cart records that identify the merchant as the affiliated merchant and are not marked profit paid. Server 12 computes the partial profit due to the merchant for the sale reflected by a shopping cart record, and these partial profits are accumulated. Then a check for the accumulated profit is issued and mailed to the merchant. The check number of the printed check is inserted into the records in the associated records in the purchase and shopping cart table and those records are marked profit paid. At the same time, a record is inserted into the merchant check information table, storing the check number and the transaction identifiers for the transaction that the check relates to, as well as the amount of the check and the date that it was printed.

A further follow-up process 816 is performed whenever a consumer or merchant returns an item. When an item is returned, the merchant or consumer is issued a credit in step 818 by crediting an account balance or by crediting a credit card number. Then in step 820 the item is returned to stock and the item information table is updated to increase the number of items available, to reflect that the returned item that has been returned to stock.

A follow-up process 822 which is performed periodically, ages old data from the purchase and shopping cart records and other tables in server 12. In the purchase and shopping cart table, old records for sold items are archived and deleted, and old records for unsold items (i.e., items left in a consumer's virtual shopping cart but not purchased) are deleted. In the invoice information table, old records are archived and deleted (step 824).

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A merchant-affiliated direct marketing and fulfillment system, comprising:
    a computer server connected to a remote computer system under control of a consumer, wherein the server
        delivers to the remote computer system, information regarding products offered for retail sale to said consumer by a business entity operating the server;
        receives consumer identifying information from the remote computer and determines that the consumer has been assigned to one of a plurality of independent retail merchants registered with the server, wherein the server prevents reassignment of the consumer using said remote computer to another independent retail merchant registered with the server; and
        delivers to the remote computer the assigned retail merchant's information regarding products for sale and the merchant's identifying information, to be displayed by the remote computer.

2. The system of claim 1, wherein
    said server delivers to the consumer a retail merchant's retail price for a product for retail sale, the retail price being set by the merchant and being computed by reference to a wholesale price for the product.

3. The system of claim 2, wherein
    the server stores markup information provided by a merchant, and
    after a merchant has been assigned to a consumer, the server retrieves the merchant's markup information, and computes from it a retail price to provide to the consumer along with the identifying information for the retail merchant.

4. The system of claim 1 wherein said identifying information for an assigned retail merchant comprises one or more of a name, a logo and other graphic information.

5. The system of claim 1 wherein said server consummates a retail transaction to purchase a product, with a consumer, in affiliation with a merchant, said server collecting payment and address information from the consumer and arranging for shipment of the purchased item to the consumer.

6. The system of claim 5 wherein the retail transaction consummated by the server is between the consumer and a business entity operating the server, and does not involve the affiliated retail merchant.

7. The system of claim 6 wherein said server identifies a payment amount representing a partial profit margin for a sale consummated with a consumer in affiliation with a merchant, said payment amount to be delivered to the merchant affiliated with the sale.

8. The system of claim 1 wherein pricing information for products for sale are not delivered to the remote computer or displayed to the consumer, until after the consumer has been assigned to an affiliated retail merchant.

9. The system of claim 1 wherein, after a consumer is assigned to an affiliated retail merchant, identifying information for the assigned retail merchant is supplied by the server for storage in a connected remote computer.

10. The system of claim 9 wherein said server prevents reassignment of a consumer using a remote computer to another retail merchant by detecting identifying information stored in said remote computer.

11. The system of claim 9 wherein as part of preventing reassignment of a consumer using a remote computer to another merchant, said server prevents a consumer using said remote computer from viewing pricing of a retail merchant other than the retail merchant that was previously assigned.

12. The system of claim 9 wherein said identifying information is stored temporarily by the remote computer.

13. The system of claim 9 wherein said identifying information is stored permanently by the remote computer.

14. The system of claim 1 wherein said server prevents a consumer from consummating a transaction to purchase a product, until after the consumer has been assigned a permanent login identification.

15. The system of claim 14 wherein said server associates a permanent user login identification assigned to a consumer, with a particular retail merchant, and said server responds to a login identification provided by a consumer by delivering identifying information related to the merchant that has been associated with the login identification provided by the consumer.

16. The system of claim 1 wherein said server receives a consumer zip code from a consumer, and selects a retail merchant for assignment to the consumer by locating an affiliate merchant having a nearest to a matching zip code.

17. The system of claim 16 wherein said server selects a merchant for assignment to the consumer at random, from among multiple merchants having zip codes equally similar to a zip code provided by the consumer.

18. The system of claim 1 wherein the identification of an affiliated merchant that is supplied to the remote computer, comprises a logo or other graphical information, and an identifier useable by the server for identifying the merchant.

19. The system of claim 18 wherein the identification of an affiliated merchant that is supplied to the remote computer is returned to the server during interaction of the remote computer and server.

20. The system of claim 1 wherein said server is responsive to information regarding orders that have been taken by a retail merchant, by fulfilling these orders by direct shipment to customers.

21. A method of merchant-affiliated direct marketing and fulfillment, comprising:
connecting a server to a remote computer system under control of a consumer;
delivering to the remote computer system by the server, information regarding products offered for retail sale to said consumer by a business entity operating the server;
receiving by the server consumer identifying information from the remote computer and determining by the server the consumer has been assigned to one of a plurality of independent retail merchants registered with the server, wherein the server prevents reassignment of the consumer using said remote computer to another independent retail merchant registered with the server; and
delivering to the remote computer the assigned retail merchant's information regarding products for sale and the merchant's identifying information to be displayed by the remote computer.

22. A merchant-affiliated direct marketing and fulfillment system, comprising:
a computer server connected to a remote computer system under control of a consumer, wherein the server
maintains an identification of those products that are authorized for online sale by each of a plurality of independent retail merchants that are affiliated with the entity operating the server;
receives computer identifying information from the remote computer and determines that the consumer has been assigned to one of a plurality of independent retail merchants registered with the server, wherein the server prevents reassignment of the consumer using said remote computer to another independent retail merchant registered with the server; and
delivers to the remote computer system, the assigned retail merchant's identifying information and information regarding products offered for retail sale to said consumer to be displayed by the remote computer, but does not provide product information for products that are not authorized for sale by the merchant assigned to the consumer.

23. The system of claim 22 wherein said server generates an identification of products that are authorized for on line sale is provided by a manufacturer, through an indication as to whether a particular merchant is permitted or is not permitted to perform online sales of one or more particular products.

24. The system of claim 22 wherein
said computer server stores for a plurality of products, an identification of a manufacturer and a manufacturers authorization level,
said server stores for a plurality of retail merchants, one or more authorization levels for each of a plurality of manufacturers, and
said server determines whether there is a match between the authorization level of a retail merchant for a particular manufacturer and the required authorization level for a particular product, before providing product information to a consumer that has been assigned to that retail merchant.

25. The system of claim 22 wherein said server is responsive to information regarding orders that have been taken by a retail merchant, by fulfilling these orders by direct shipment to customers.

26. A method of merchant-affiliated direct marketing and fulfillment, comprising:

connecting a server to a remote computer system under control of a consumer;

maintaining an identification of those products that are authorized for online sale by each of a plurality of independent retail merchants;

receiving by the server consumer information from the remote computer and determining by the server the consumer has been assigned to one of a plurality of independent retail merchants registered with the server, wherein the server prevents reassignment of the consumer using said remote computer to another merchant registered with the server; and delivering to the remote computer system, the assigned retail merchant's identifying information and information regarding products offered for retail sale to said consumer to be displayed by the remote computer, but not providing product information for products that are not authorized for sale by the merchant assigned to the consumer.

* * * * *